US011917681B2

(12) United States Patent
Kusashima

(10) Patent No.: US 11,917,681 B2
(45) Date of Patent: Feb. 27, 2024

(54) WIRELESS COMMUNICATION DEVICE, WIRELESS COMMUNICATION METHOD, AND COMPUTER PROGRAM

(71) Applicant: Sony Corporation, Tokyo (JP)

(72) Inventor: Naoki Kusashima, Tokyo (JP)

(73) Assignee: SONY CORPORATION, Tokyo (JP)

(*) Notice: Subject to any disclaimer, the term of this patent is extended or adjusted under 35 U.S.C. 154(b) by 520 days.

(21) Appl. No.: 17/261,879

(22) PCT Filed: Aug. 1, 2019

(86) PCT No.: PCT/JP2019/030130
§ 371 (c)(1),
(2) Date: Jan. 21, 2021

(87) PCT Pub. No.: WO2020/031819
PCT Pub. Date: Feb. 13, 2020

(65) Prior Publication Data
US 2021/0307072 A1 Sep. 30, 2021

(30) Foreign Application Priority Data
Aug. 9, 2018 (JP) .................................. 2018-150339

(51) Int. Cl.
H04W 74/08 (2009.01)
H04W 72/0453 (2023.01)
H04W 74/00 (2009.01)

(52) U.S. Cl.
CPC ... H04W 74/0816 (2013.01); H04W 72/0453 (2013.01); H04W 74/006 (2013.01); H04W 74/0841 (2013.01)

(58) Field of Classification Search
None
See application file for complete search history.

(56) References Cited

U.S. PATENT DOCUMENTS 10,375,739 B2 * 8/2019 Einhaus .............. H04W 52/00
2017/0251456 A1 * 8/2017 Radulescu ........... H04W 48/00
(Continued)

FOREIGN PATENT DOCUMENTS

CN 105898883 A 8/2016
EP 3439412 A 2/2019
(Continued)

OTHER PUBLICATIONS

International Search Report and Written Opinion dated Oct. 21, 2019, received for PCT Application PCT/JP2019/030130, filed on Aug. 1, 2019, 10 pages including English Translation.
(Continued)

Primary Examiner — Hong S Cho
(74) Attorney, Agent, or Firm — XSENSUS LLP

(57) ABSTRACT

There is provided a wireless communication device capable of making the wireless communication link more stable in a communication system using an unlicensed band. There is provided a wireless communication device including a determination unit (243) configured to determine whether a channel is clear or busy, a communication unit (220) configured to transmit an uplink signal of a RACH procedure, and a setting unit (243) configured to set at least a first resource and a second resource to transmit the uplink signal,
(Continued)

in which the first resource is selected from a set of resources set by information in an RRC layer, and the second resource is designated by downlink information in a physical layer.

22 Claims, 27 Drawing Sheets

(56) References Cited

U.S. PATENT DOCUMENTS

| | | | | |
|---|---|---|---|---|
| 2018/0110074 | A1* | 4/2018 | Akkarakaran | .... H04W 74/0833 |
| 2022/0312484 | A1* | 9/2022 | Murray | ............... H04W 74/085 |

FOREIGN PATENT DOCUMENTS

| | | |
|---|---|---|
| WO | 2017/121212 A1 | 7/2017 |
| WO | 2017/170678 A1 | 10/2017 |
| WO | WO-2017166839 A1 | 10/2017 |
| WO | WO-2018075256 A1 | 4/2018 |
| WO | 2018/124026 A1 | 7/2018 |
| WO | 2018/139575 A1 | 8/2018 |

OTHER PUBLICATIONS

Qualcomm Incorporated, "Study on NR-based Access to Unlicensed Spectrum", 3GPP TSG RAN Meeting #77, RP-172021, Sep. 11-14, 2017, 5 pages.

Huawei et al.: "Random access in NR unlicensed", 3GPP Draft: R1-1803881, 3rd Generation Partnership Project (3GPP), Mobile Competence Centre ; 650,Route Des Lucioles ; F-06921 Sophia Antipolis Cedex; France vol. RAN WG1, No. Sanya, China; Apr. 16, 2018-Apr. 20, 2018 Apr. 15, 2018 (Apr. 15, 2018), XP061425978, Retrieved from the Internet:URL: http://www.3gpp.org/tfp/Meetings%5F3GPP%5FSYNC/RAN1/Docs/[retrieved on Apr. 15, 2018].

Samsung: "Discussion on random access procedure for eLAA", 3GPP Draft; R1-164749; 3rd Generation Partnership Project (3GPP), Mobile Competence Centre ; 650, Route Des Lucioles ; F-06921 Sophia Antipolis Cedex; France vol. RAN WG1, No. Nanjing, China; May 23, 2016-May 27, 2016 May 14, 2016 (May 14, 2016), XP061095334, Retrieved from the Internet: URL: http://www.3gpp.org/ftp/tsg_ranWG1_RL1/TSGR1_85/Docs/ [retrieved on May 14, 2016].

* cited by examiner

FIG. 3

| SUBCARRIER SPACING SETTING $\mu$ | SUBCARRIER SPACING [kHz] | CYCLIC PREFIX | NUMBER OF SYMBOLS PER SLOT | NUMBER OF SLOTS PER RADIO FRAME | NUMBER OF SLOTS PER SUBFRAME |
|---|---|---|---|---|---|
| 0 | 15 | NORMAL CP | 14 | 10 | 1 |
| 1 | 30 | NORMAL CP | 14 | 20 | 2 |
| 2 | 60 | NORMAL CP | 14 | 40 | 4 |
| 2 | 60 | EXTENDED CP | 12 | 40 | 4 |
| 3 | 120 | NORMAL CP | 14 | 80 | 8 |
| 4 | 240 | NORMAL CP | 14 | 160 | 16 |

WIRELESS COMMUNICATION DEVICE, WIRELESS COMMUNICATION METHOD, AND COMPUTER PROGRAM

CROSS-REFERENCE TO RELATED APPLICATIONS

The present application is based on PCT filing PCT/JP2019/030130, filed Aug. 1, 2019, which claims priority to JP 2018-150339, filed Aug. 9, 2018, the entire contents of each are incorporated herein by reference.

TECHNICAL FIELD

The present disclosure relates to a wireless communication device, a wireless communication method, and a computer program.

BACKGROUND ART

Wireless access schemes and wireless networks of cellular mobile communication (hereinafter also referred to as Long Term Evolution (LTE), LTE-Advanced (LTE-A), LTE-Advanced Pro (LTE-A Pro), New Radio (NR), New Radio Access Technology (NRAT), 5G, Evolved Universal Terrestrial Radio Access (EUTRA), or Further EUTRA (FEUTRA)) are under review in 3rd Generation Partnership Project (3GPP). Further, in the following description, LTE includes LTE-A, LTE-A Pro, and EUTRA, and NR includes NRAT and FEUTRA. In LTE, a base station device (base station) is also referred to as an evolved Node B (eNodeB), in NR, the base station device (base station) is also referred to as gNodeB, and in LTE and NR, a terminal device (a mobile station, a mobile station device, or a terminal) is also referred to as a user equipment (UE). LTE and NR are cellular communication systems in which a plurality of areas covered by a base station device is arranged in a cell form. A single base station device may manage a plurality of cells.

NR is a different Radio Access Technology (RAT) from LTE as a wireless access scheme of the next generation of LTE. NR is an access technology capable of handling various use cases including Enhanced Mobile broadband (eMBB), Massive Machine Type Communications (mMTC), and Ultra Reliable and Low Latency Communications (URLLC). NR is reviewed for the purpose of a technology framework corresponding to use scenarios, request conditions, placement scenarios, and the like in such use cases.

The operation and management of wireless access schemes based on cellular communication in unlicensed bands and license shared bands is being considered. In such unlicensed bands, coexistence with other nodes and wireless systems is important, and function such as Listen Before Talk (LBT), which senses the channel before transmitting, and discontinuous transmission are demanded for wireless access schemes such as LTE and NR. Details about a wireless access scheme based on NR in unlicensed bands are disclosed in Non-Patent Document 1. Note that the unlicensed bands are the 2.4 GHz band, the 5 GHz band, and the 6 GHz band, for example. The license shared bands are the 3.5 GHz band and the 37 GHz band, for example.

Typically, in spectrum shared by different operators such as an unlicensed band or a license shared band, transmission is performed in accordance with a concept referred to as Listen Before Talk (LBT) to maintain fairness in providing transmission opportunities. An operator refers to a telecommunications carrier having a network for mobile communication and providing mobile communication services. According to LBT, a transmission device performs carrier sensing before transmission to check whether the channel is idle, and transmits after obtaining channel access rights. From the perspective of channel fairness, in many cases the transmission device secures the channel when data to be transmitted is generated, and releases the channel when transmission ends after a fixed period.

CITATION LIST

Non-Patent Document

Non-Patent Document 1: RP-172021, "Study on NR-based Access to Unlicensed Spectrum," 3GPP TSG RAN Meeting #77, Sapporo, Japan, Sep. 11-14, 2017.

SUMMARY OF THE INVENTION

Problems to be Solved by the Invention

Basically, in an unlicensed band, a communication device performs LBT to sense the channel before transmission. However, depending on the result of LBT, the communication device may be unable to transmit. Consequently, necessary information does not arrive normally, which leads to instability in the wireless communication link.

Accordingly, the present disclosure proposes a novel and improved wireless communication device, wireless communication method, and computer program capable of making the wireless communication link more stable in a communication system using an unlicensed band.

Solutions to Problems

According to the present disclosure, there is provided a wireless communication device including a determination unit configured to determine whether a channel is clear or busy, a communication unit configured to transmit an uplink signal of a RACH procedure, and a setting unit configured to set at least a first resource and a second resource to transmit the uplink signal, in which the first resource is selected from a set of resources set by information in an RRC layer, and the second resource is designated by downlink information in a physical layer.

Further, according to the present disclosure, there is provided a wireless communication device including a determination unit configured to determine whether a channel is clear or busy, a communication unit configured to receive an uplink signal of a RACH procedure, and a setting unit configured to set at least a first resource and a second resource for transmitting the uplink signal, in which the first resource is selected from a set of resources set by information in an RRC layer, and the communication unit designates the second resource by downlink information in a physical layer.

Further, according to the present disclosure, there is provided a wireless communication method including determining whether a channel is clear or busy, transmitting an uplink signal of a RACH procedure, and setting at least a first resource and a second resource to transmit the uplink signal, in which the first resource is selected from a set of resources set by information in an RRC layer, and the second resource is designated by downlink information in a physical layer.

Further, according to the present disclosure, there is provided a wireless communication method including determining whether a channel is clear or busy, receiving an uplink signal of a RACH procedure, and setting at least a first resource and a second resource for transmitting the uplink signal, in which the first resource is selected from a set of resources set by information in an RRC layer, and the communication unit designates the second resource by downlink information in a physical layer.

Further, according to the present disclosure, there is provided a computer program causing a computer to execute a process including determining whether a channel is clear or busy, transmitting an uplink signal of a RACH procedure, and setting at least a first resource and a second resource to transmit the uplink signal, in which the first resource is selected from a set of resources set by information in an RRC layer, and the second resource is designated by downlink information in a physical layer.

Further, according to the present disclosure, there is provided a computer program causing a computer to execute a process including determining whether a channel is clear or busy, receiving an uplink signal of a RACH procedure, and setting at least a first resource and a second resource for transmitting the uplink signal, in which the first resource is selected from a set of resources set by information in an RRC layer, and the communication unit designates the second resource by downlink information in a physical layer.

Effects of the Invention

According to the present disclosure as described above, a novel and improved wireless communication device, wireless communication method, and computer program capable of making the wireless communication link more stable in a communication system using an unlicensed band can be provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is a table for explaining a subcarrier spacing setting.

MODE FOR CARRYING OUT THE INVENTION

Figure 1:
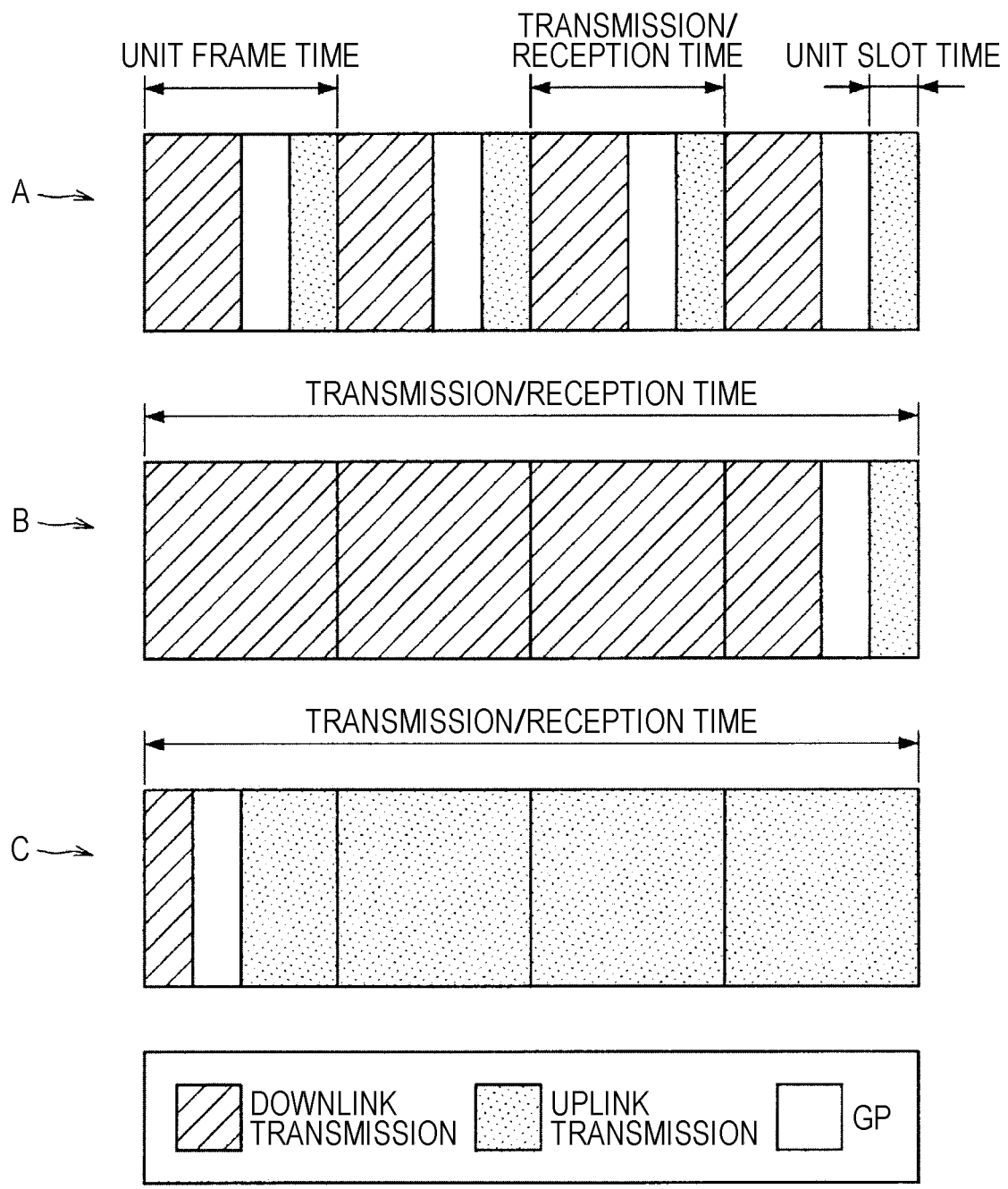
FIG. 1 is an explanatory diagram illustrating examples (A to C) of self-contained transmission frame configurations according to the embodiment.

Hereinafter, (a) preferred embodiment(s) of the present disclosure will be described in detail with reference to the appended drawings. Note that, in this specification and the appended drawings, constituent elements that have substantially the same function and configuration are denoted with the same reference numerals, and repeated explanation of these constituent elements is omitted.

Note that description will be provided in the following order.

1. Embodiment of present disclosure
   1.1. Related technology
   1.2. Circumstances
   1.3. Configuration examples
   1.4. Operation examples
2. Application examples
3. Conclusion

1. EMBODIMENT OF PRESENT DISCLOSURE

1.1. Related Technology

First, technology related to the proposed technique will be described.

<NR Frame Configuration in the Present Embodiment>

In NR, physical channels and/or physical signals can be transmitted by self-contained transmission. FIG. 1 is a diagram showing an example of a frame configuration of self-contained transmission in the present embodiment (A to C). In self-contained transmission, a single transmission/reception includes continuous downlink transmission, GP, and continuous downlink transmission in order from the top. The continuous downlink transmission includes at least a single piece of downlink control information and DMRS. The downlink control information provides an instruction to receive a downlink physical channel included in the continuous downlink transmission or an instruction to transmit an uplink physical channel included in the continuous uplink transmission. In a case where the instruction to receive the downlink physical channel has been provided by the downlink control information, a terminal device 200 attempts to receive the downlink physical channel on the basis of the downlink control information. Then, the terminal device 200 transmits a result as to whether or not the downlink physical channel has been successfully received (successfully decoded), through an uplink control channel included in the uplink transmission allocated after the GP. Meanwhile, in a case where the instruction to transmit the uplink physical channel has been provided by the downlink control information, the uplink physical channel to be transmitted on the basis of the downlink control information is included in uplink transmission, and then transmitted. As described above, it is possible to immediately cope with an increase or decrease in uplink and downlink traffic rates by flexibly switching between uplink data transmission and downlink data transmission according to the downlink control information. Furthermore, it is possible to achieve low-delay downlink communication by providing notification of success or failure in downlink reception through uplink transmission immediately following the downlink reception.

A unit slot time is the smallest time unit defining downlink transmission, GP, or uplink transmission. The unit slot time is reserved for any of downlink transmission, GP, and uplink transmission. The unit slot time does not include both downlink transmission and uplink transmission. The unit slot time may be the minimum transmission time for a channel associated with DMRS included in the unit slot time. One unit slot time is defined by, for example, an NR sampling interval ($T_s$) or an integral multiple of a symbol length.

A unit frame time may be the minimum time specified in scheduling. The unit frame time may be the smallest unit in which a transport block is transmitted. The unit slot time may be the maximum transmission time for the channel associated with the DMRS included in the unit slot time. The unit frame time may be a unit time for uplink transmission power to be determined in the terminal device 200. The unit frame time may be referred to as a subframe. There are three types of unit frame time as follows: downlink transmission only, uplink transmission only, and a combination of uplink transmission and downlink transmission. One unit frame time is defined by, for example, the NR sampling interval ($T_s$), the symbol length, or an integral multiple of the unit slot time.

A transmission/reception time is a time required for a single transmission/reception. An interval between a single transmission/reception and another transmission/reception is occupied by a time (gap) in which none of physical channels and physical signals is transmitted. The terminal device 200 does not need to average CSI measurements concerning different transmissions/receptions. The transmission/reception time may be referred to as TTI. One transmission/reception time is defined by, for example, the NR sampling interval ($T_s$), the symbol length, the unit slot time, or an integral multiple of the unit frame time.

Figure 2:
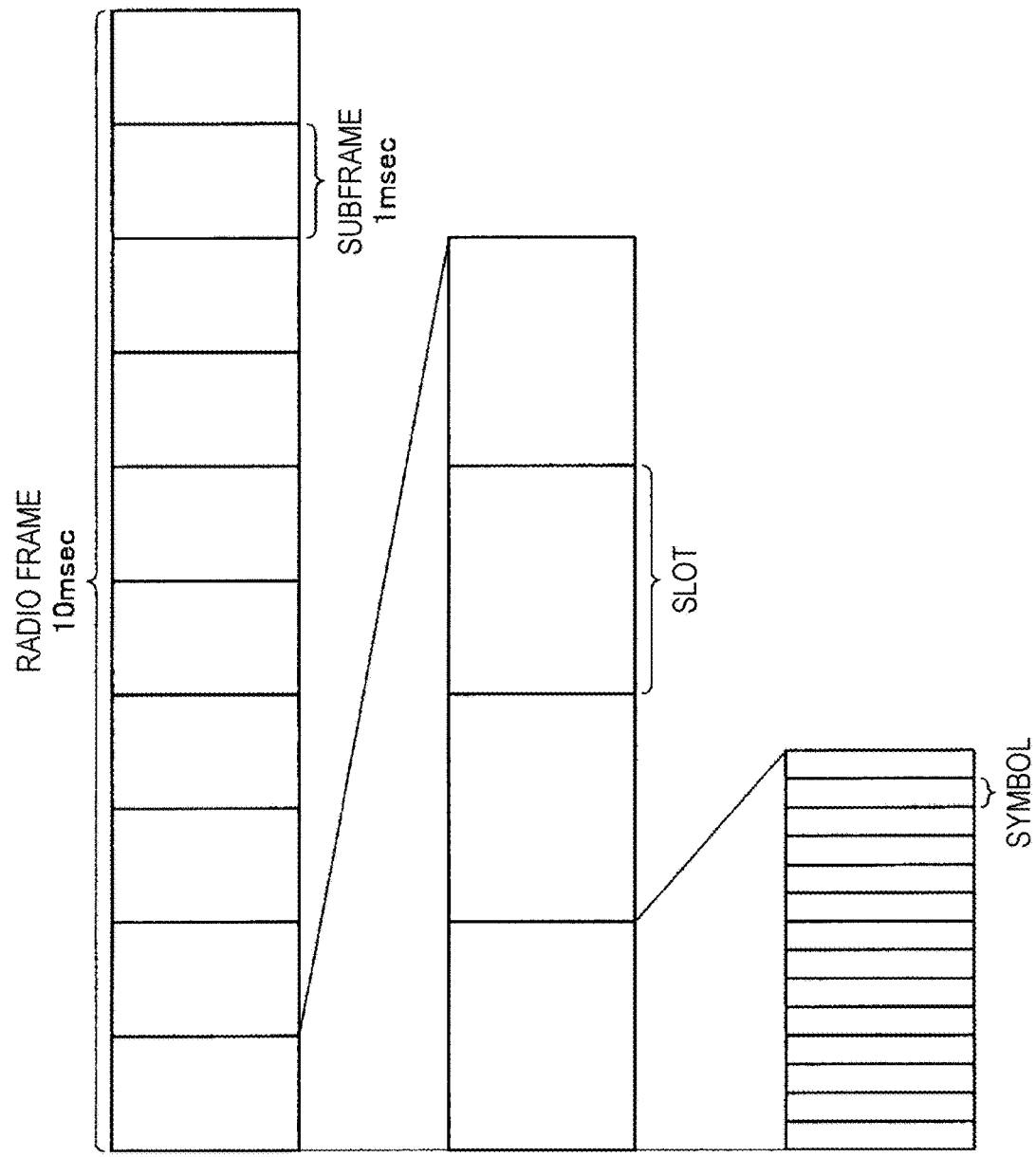
FIG. 2 is an explanatory diagram illustrating a frame configuration.

In the embodiment, a 10 millisecond (ms) radio frame is prescribed. Each radio frame contains two half frames. The time interval of each half frame is 5 ms. Each half frame contains five subframes. The time interval of each subframe is 1 ms. Furthermore, a single subframe contains one or more slots. The time interval of a slot depends on the numerology (OFDM numerology). The numerology is prescribed by the combination of the subcarrier spacing (SCS) and the cyclic prefix (CP). In the embodiment, the supported subcarrier spacings are prescribed by multiplying a standard of 15 kilohertz (kHz) by powers of 2. Specifically, 15 kHz, 30 kHz, 60 kHz, 120 kHz, and 240 kHz are supported as subcarrier spacings. The time interval of a slot is 1 ms for the 15 kHz subcarrier spacing, 0.5 ms for the 30 kHz subcarrier spacing, 0.25 ms for the 60 kHz subcarrier spacing, 0.125 ms for the 120 kHz subcarrier spacing, and 0.0625 ms for the 240 kHz subcarrier spacing. A single slot contains 14 symbols in the case of a normal CP, and 12 symbols in the case of an extended CP. FIG. 2 is an explanatory diagram illustrating a frame configuration. FIG. 3 is a table for explaining a subcarrier spacing setting.

<Resource Allocation for Uplink Channel/Signal According to Embodiment>

In a licensed band, a terminal device is allocated transmission resources for an uplink channel/signal in units of resource blocks according to a designation from a base station device. Generally, it is preferable to allocate resource blocks that are continuous on the frequency axis to the terminal device. This arrangement makes it possible to narrow the transmission bandwidth of the terminal device and improve the transmission power efficiency of the terminal device.

On the other hand, when using an unlicensed band, there is demand for maintaining a constant power spectral density (PSD) in the channel. To reduce the transmission power while keeping the power spectral density (PSD) in the channel constant, interlaced resource allocation is performed with respect to an uplink channel/signal in the embodiment.

Figure 4A:
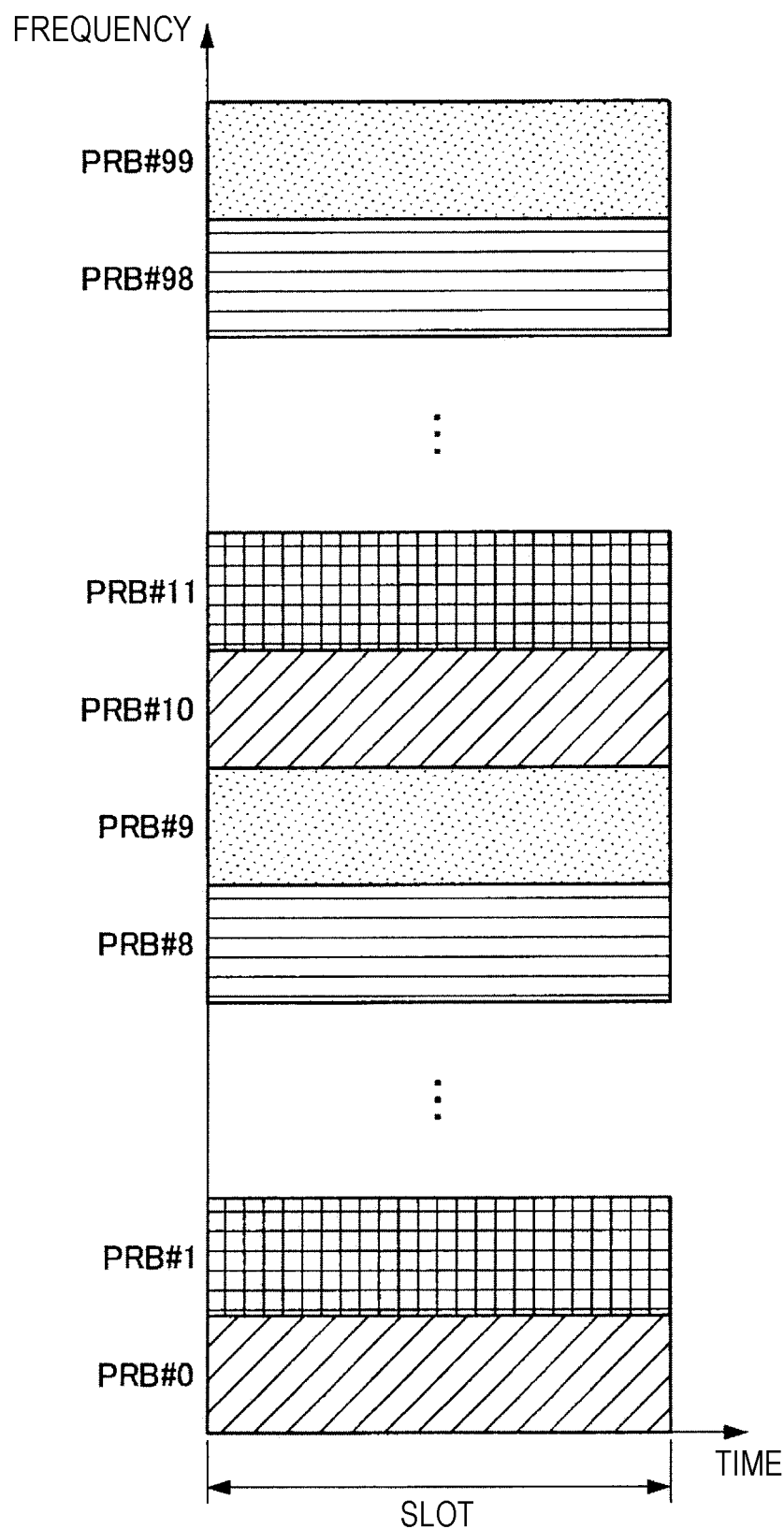
FIG. 4A is a diagram illustrating an example of frequency resource allocation for an uplink channel/signal according to the embodiment.

Interlaced resource allocation refers to allocating resource blocks separated by equal intervals to a predetermined uplink channel/signal. FIG. 4A is an example of frequency resource allocation for an uplink channel/signal according to the embodiment. Resources are allocated to a predetermined terminal device in units of single resource blocks at intervals of 10 resource blocks. With this arrangement, an uplink channel/signal can be transmitted over a wide band with low power consumption.

The number of resource block intervals to use is preferably ⅕ or less than the channel bandwidth. For example, in the case where the channel bandwidth is 20 MHz and the subcarrier spacing is 15 kHz, resources are assigned at intervals of 10 resource blocks (1.8 MHz).

Figure 4B:
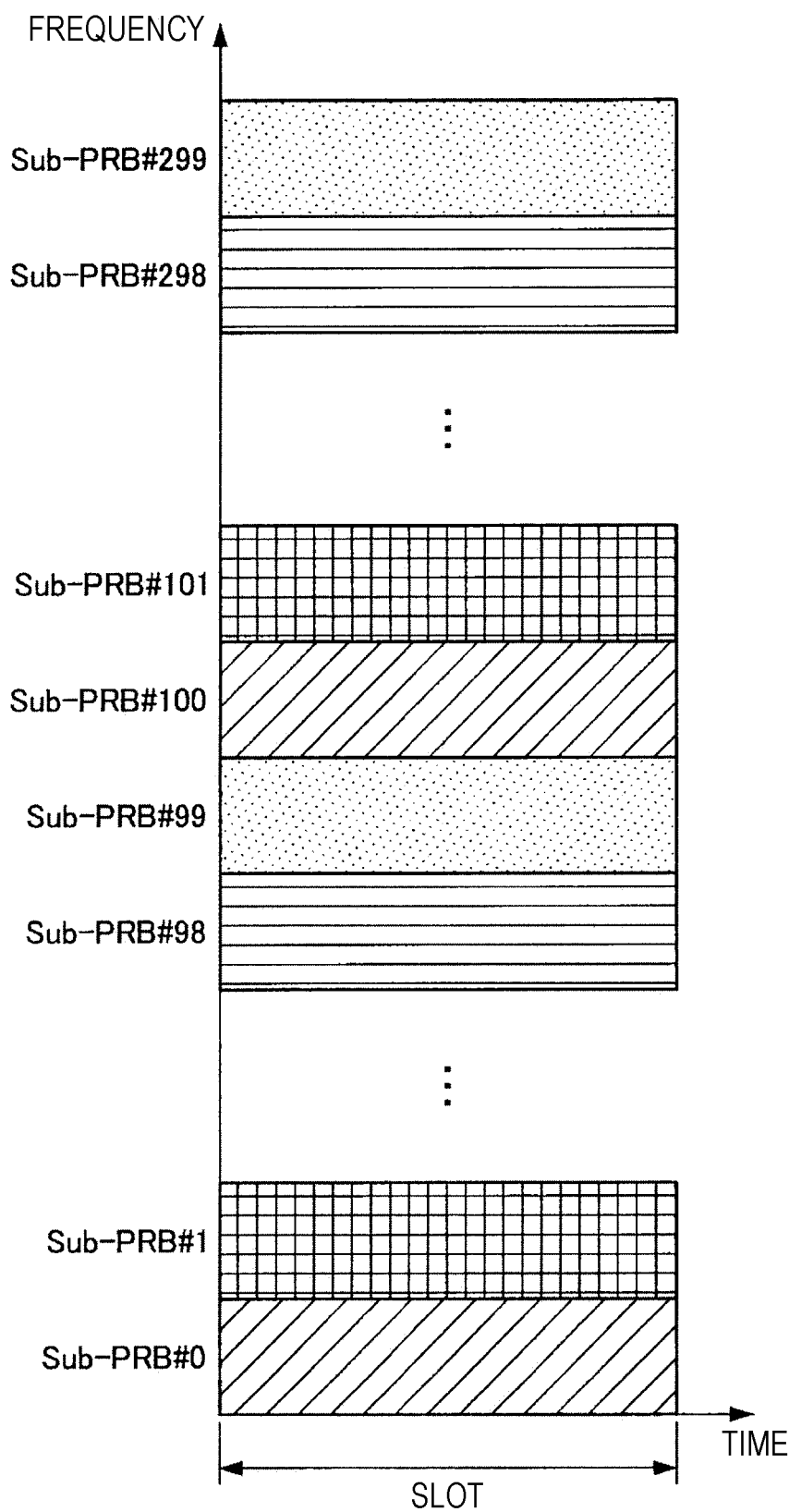
FIG. 4B is a diagram illustrating an example of frequency resource allocation for an uplink/signal according to the embodiment.

Also, the units of interlaced resource allocation are not limited to units of resource blocks. FIG. 4B is an example of frequency resource allocation for an uplink/signal according to the embodiment. The units of interlaced resource allocation in FIG. 4B are sub-resource blocks (sub-PRBs). Sub-resource blocks are units of continuous frequency resources narrower than resource blocks. For example, a sub-resource block is a set of 1, 2, 3, 4, or 6 continuous subcarriers. This arrangement makes more fine-grained resource allocation possible.

Figure 4C:
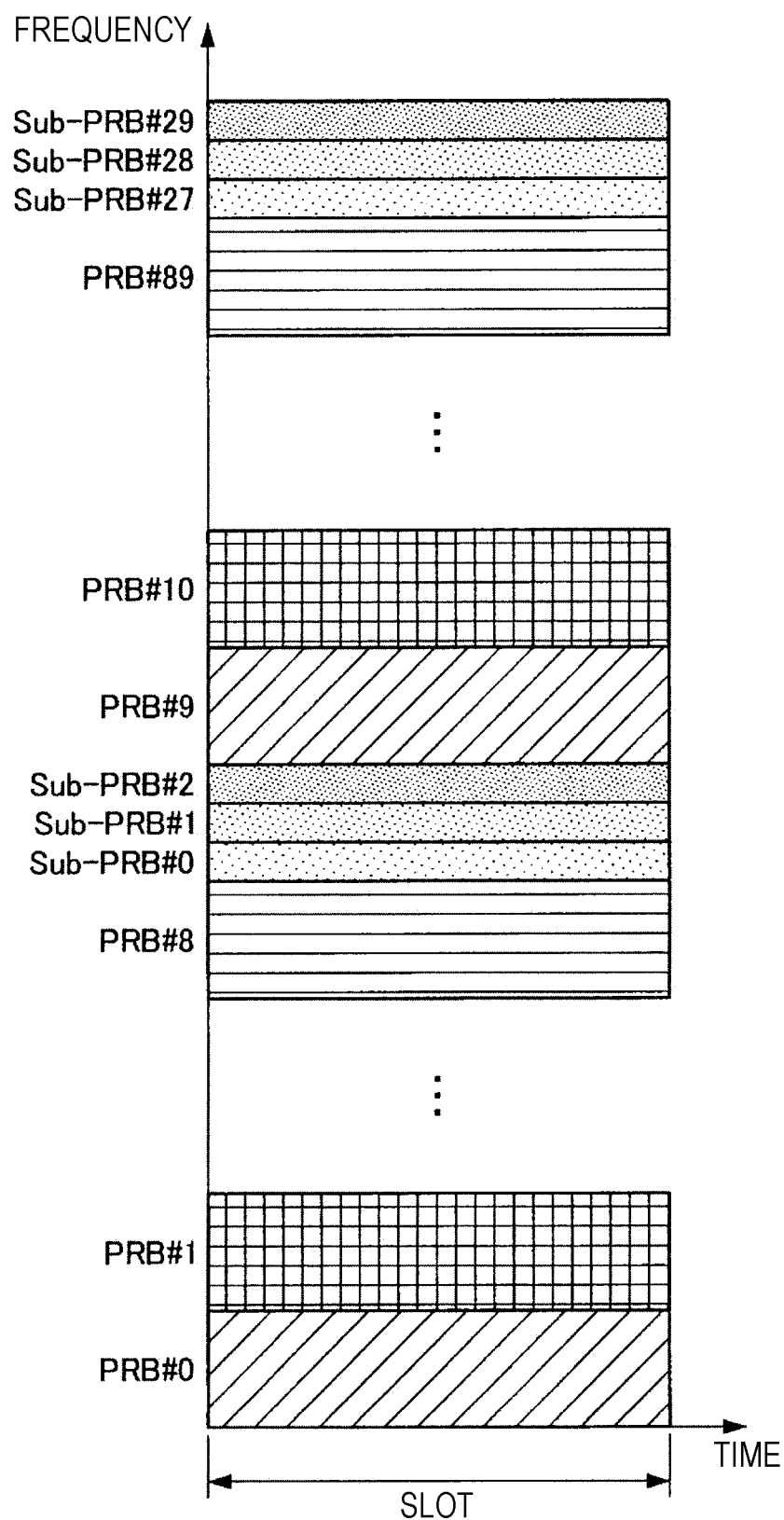
FIG. 4C is a diagram illustrating an example of frequency resource allocation for an uplink channel/signal according to the embodiment.

Furthermore, it is also possible to combine a plurality of different types of interlaced resource allocation. FIG. 4C is an example of frequency resource allocation for an uplink channel/signal according to the embodiment. FIG. 4C is an example in which interlaced resource allocation in units of resource blocks and interlaced resource allocation in units of sub-resource blocks are frequency-multiplexed. For example, the PUCCH is allocated in units of sub-resource blocks while the PUSCH is allocated in units of resource blocks. With this configuration, the amount of allocated resources can be varied flexibly according to the amount of uplink information to transmit.

Figure 4D:
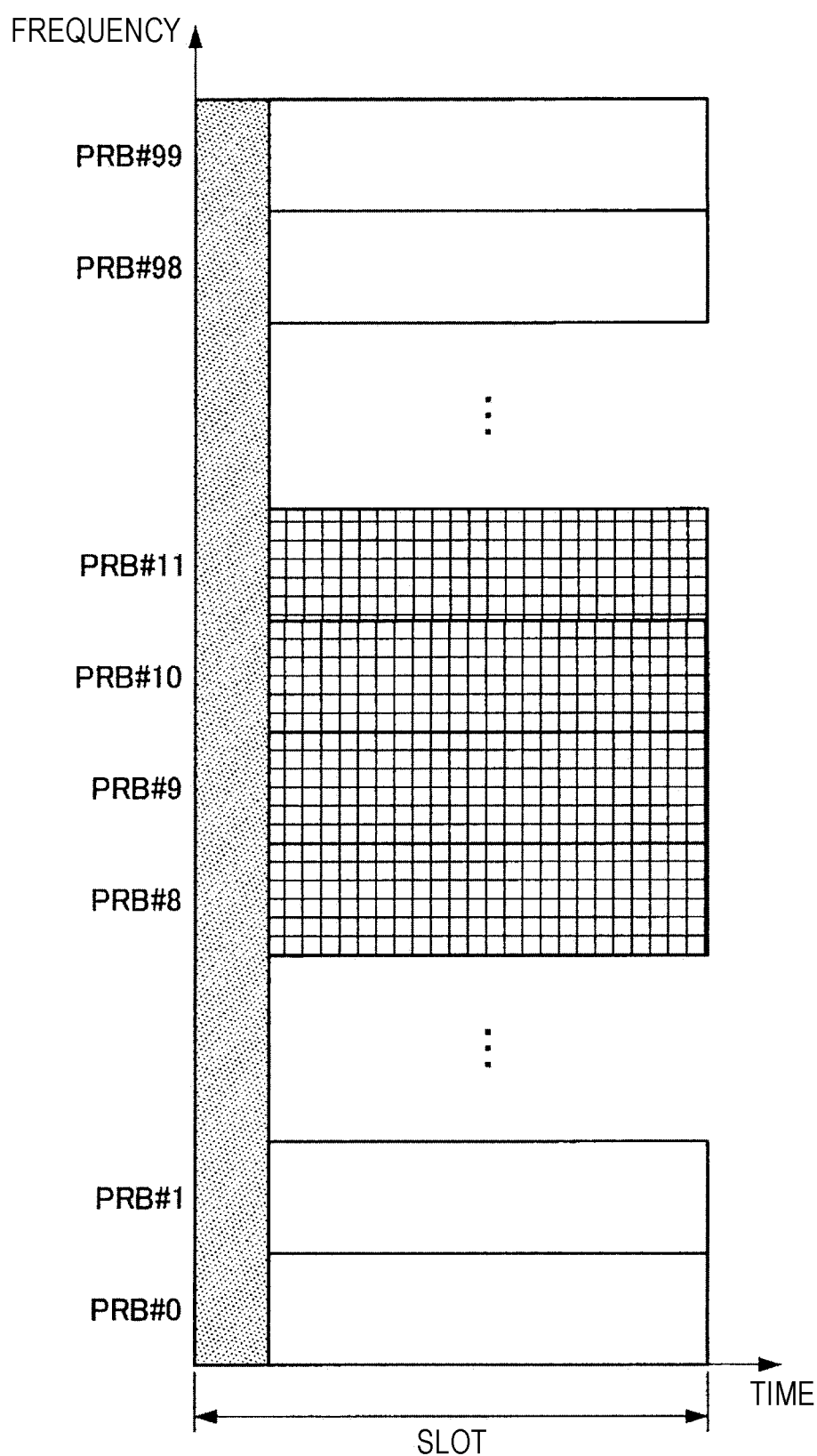
FIG. 4D is a diagram illustrating an example of frequency resource allocation for an uplink channel/signal according to the embodiment.
Figure 4E:
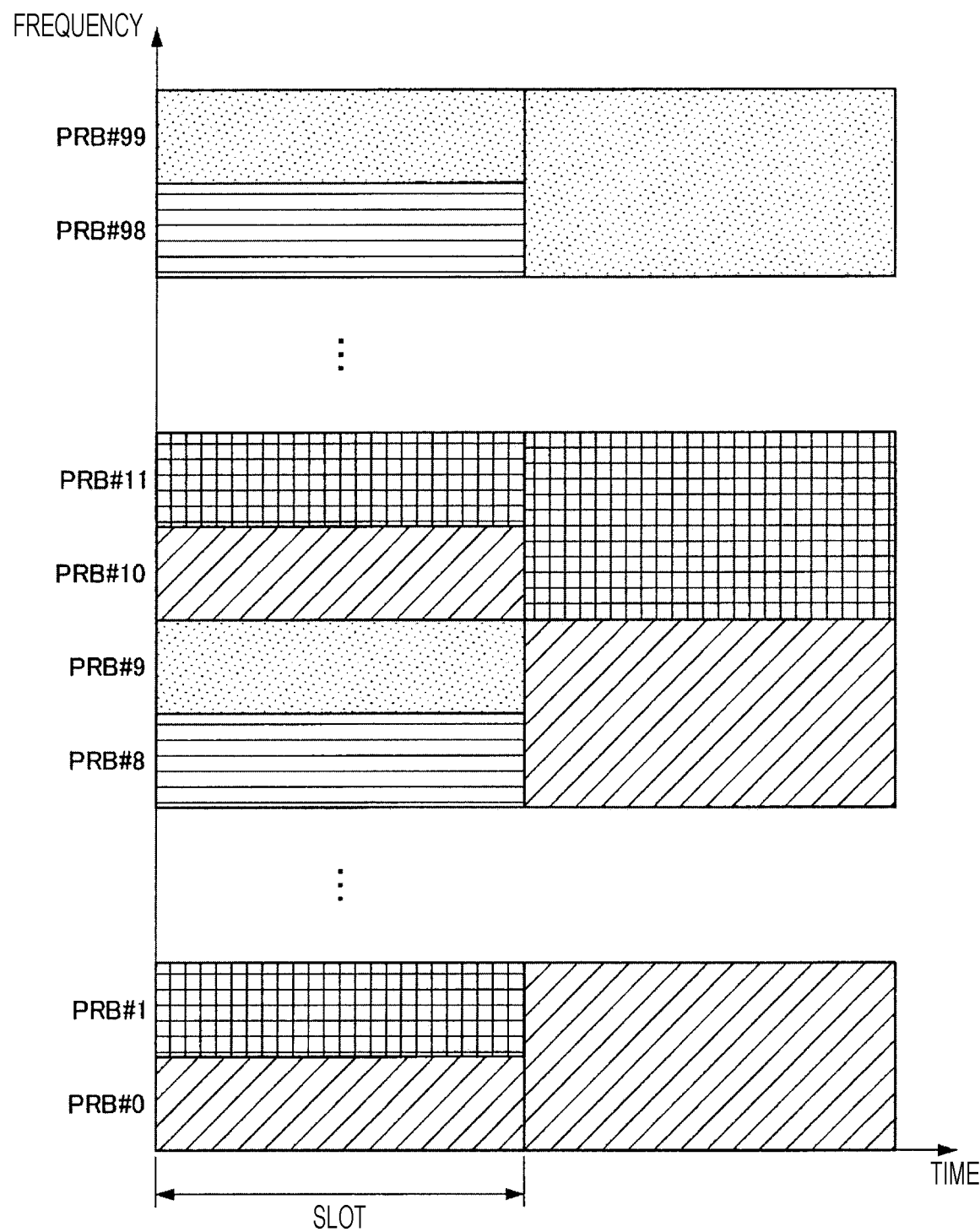
FIG. 4E is a diagram illustrating an example of frequency resource allocation for an uplink channel/signal according to the embodiment.

Furthermore, in the embodiment, wideband transmission and narrowband transmission of an uplink channel/signal can be combined. If the terminal device is still inside the channel exclusivity time after transmitting an uplink channel/signal on a wide band, the terminal device may also transmit an uplink channel/signal subsequently on a narrow band narrower than the channel band. FIGS. 4D and 4E are examples of frequency resource allocation for an uplink channel/signal according to the embodiment. In FIG. 4D, the SRS or the short PUCCH is transmitted using the first few symbols and the full band, and the PUSCH is subsequently transmitted on a narrow band. In FIG. 4E, an uplink channel/signal is transmitted by interlaced resource allocation in a first slot inside the channel exclusivity time, and an uplink channel/signal is transmitted by continuous resource block allocation on the frequency axis in a second slot inside the channel exclusivity time. With this arrangement, both the demand on the power spectral density demand and low power consumption can be achieved.

<RACH Procedure According to Present Embodiment>

An RACH procedure is performed to achieve the purpose such as RRC connection setup from an idle state to a non-active state or a connected state, request for state transition from the non-active state to the connected state, handover for switching a connected cell, scheduling request for requesting resources for uplink data transmission, timing advance adjustment for adjusting uplink synchronization, on-demand SI request for requesting system information which has not been transmitted, and recovery of beam connection which has been interrupted (beam recovery).

The RRC connection setup from the idle state to the non-active state or the connected state is operation to be performed when the terminal device is connected to the base station device in response to occurrence of traffic, or the like. Specifically, the RRC connection setup is operation for passing information regarding connection (for example, UE context) from the base station device to the terminal device. The UE context is managed with predetermined terminal device identification information (for example, C-RNTI) designated from the base station device. When this operation is finished, the state of the terminal device transitions from the idle state to the non-active state or from the idle state to the connected state.

The request for state transition from the non-active state to the connected state is operation for requesting state transition from the non-active state to the connected state in response to occurrence of traffic, or the like. By the state transitioning to the connected state, the terminal device can transmit/receive unicast data to/from the base station device.

The handover for switching a connected cell is operation for switching connection from a cell (serving) to which the terminal device is connected to a cell adjacent to the cell (neighbor cell) as a result of change of a radio wave environment by movement of the terminal device. The terminal device which has received a handover command from the base station device requests connection to the neighbor cell designated by the handover command.

The scheduling request is operation of requesting resources for uplink data transmission in response to occurrence of traffic, or the like. After the base station device normally receives this scheduling request, the base station device allocates PUSCH resources to this terminal device. Note that the scheduling request is performed also by the PUCCH.

The timing advance adjustment for adjusting uplink synchronization is operation for adjusting an error between a downlink frame and an uplink frame occurring by a propagation delay. The terminal device transmits a PRACH at a timing adjusted to the downlink frame. By this means, the base station device can recognize a propagation delay with the terminal device, so that the base station device can instruct the terminal device about a timing advance value using Message 2, or the like.

The on-demand SI request for requesting system information which has not been transmitted is operation of requesting the base station device to transmit the system information in a case where the system information which has not been transmitted for the purpose of an overhead, or the like, of the system information is necessary for the terminal device.

The recovery of beam connection which has been interrupted (beam recovery) is operation of requesting recovery in a case where communication quality degrades due to movement of the terminal device, interruption of a communication path by other objects, or the like, after a beam is established. The base station device which has received this request tries connection to the terminal device using different beams.

The RACH procedure is further classified into a contention-based RACH procedure and a non-contention RACH procedure.

Figure 5:
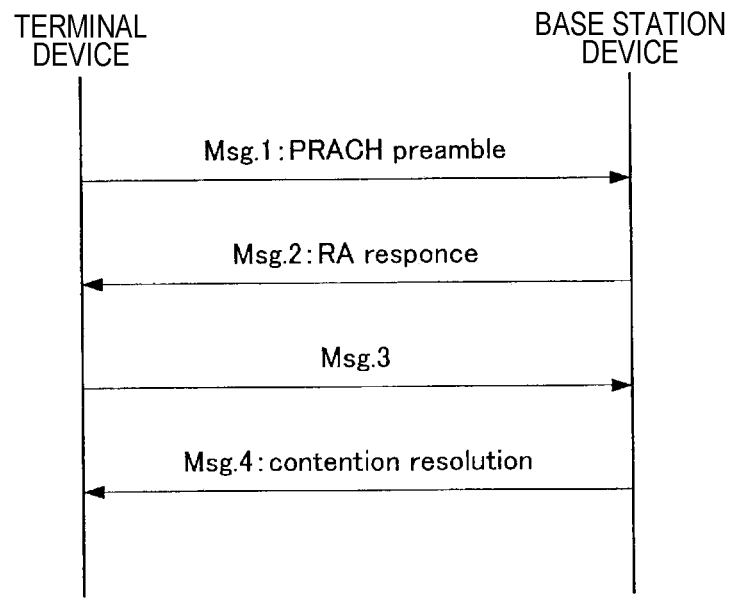
FIG. 5 is a flowchart illustrating a contention-based RACH procedure.

The contention-based RACH procedure is an RACH procedure performed on the initiative of the terminal device. The contention-based RACH procedure is a procedure including four steps starting from transmission of Message 1 (PRACH, RACH preamble) from the terminal device. FIG. 5 is a flowchart illustrating a contention-based RACH procedure. The terminal device selects a plurality of RACH resources and a plurality of PRACH preambles preset by the system information or dedicated RRC signaling, and transmits the PRACH. The base station device transmits Message 2 (Msg2, random access response, RA response) for the PRACH. Next, the terminal device transmits Message 3 (Msg3) using the uplink resource scheduled by the uplink grant included in Message 2. Finally, the base station device transmits Message 4 (Msg4) as a response to Message 3. Because these plurality of RACH resources and plurality of PRACH preambles are shared with other terminal devices, there is a case where PRACHs may contend with each other.

Figure 6:
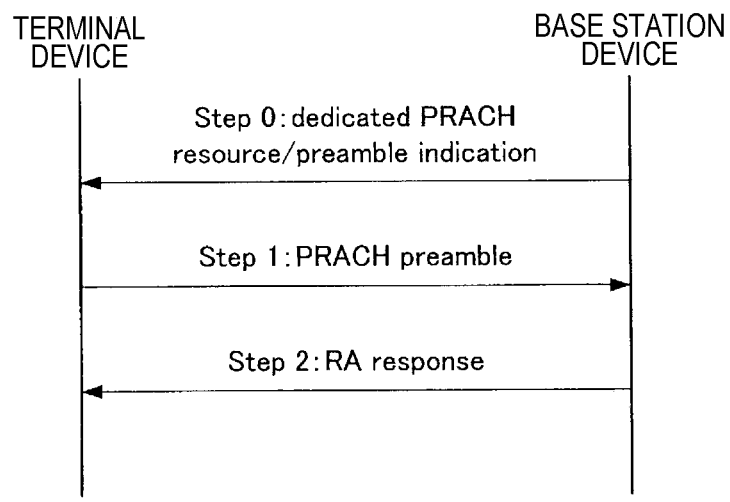
FIG. 6 is a flowchart illustrating a non-contention-based RACH procedure.

The non-contention RACH procedure is a RACH procedure led by the base station. The non-contention RACH procedure is a three-step procedure starting from the designation of a dedicated PRACH resource/preamble from the base station device. FIG. 6 is a flowchart illustrating the non-contention-based RACH procedure. The base station device designates to the terminal device a dedicated PRACH resource designated by RRC signaling and/or a PRACH preamble designated by the PDCCH order. The terminal device transmits the PRACH using the PRACH resource and/or the PRACH preamble. Finally, the base station device transmits a random access response with respect to the PRACH. By having the base station device schedule a dedicated PRACH resource or PRACH preamble, contention between different PRACHs does not occur easily.

<Details about NR PRACH According to Embodiment>

The PRACH is configured using a Zadoff-Chu (ZC) sequence.

A plurality of PRACH preamble formats is specified. The PRACH preamble formats are specified using combination of parameters such as a subcarrier interval of the PRACH, a transmission bandwidth, a sequence length, the number of symbols to be used for transmission, the number of repetitions of transmission, a CP length, and a guard period length. The PRACH preamble format having a sequence length of 839 is also referred to as the long preamble, while the PRACH preamble format having a sequence length of 139 is also referred to as the short preamble.

Setting regarding the PRACH is made using the system information on the terminal device in an idol mode. Further, setting regarding the NR-PRACH is made through dedicated RRC signaling on the terminal device in a connection mode.

Figure 7:
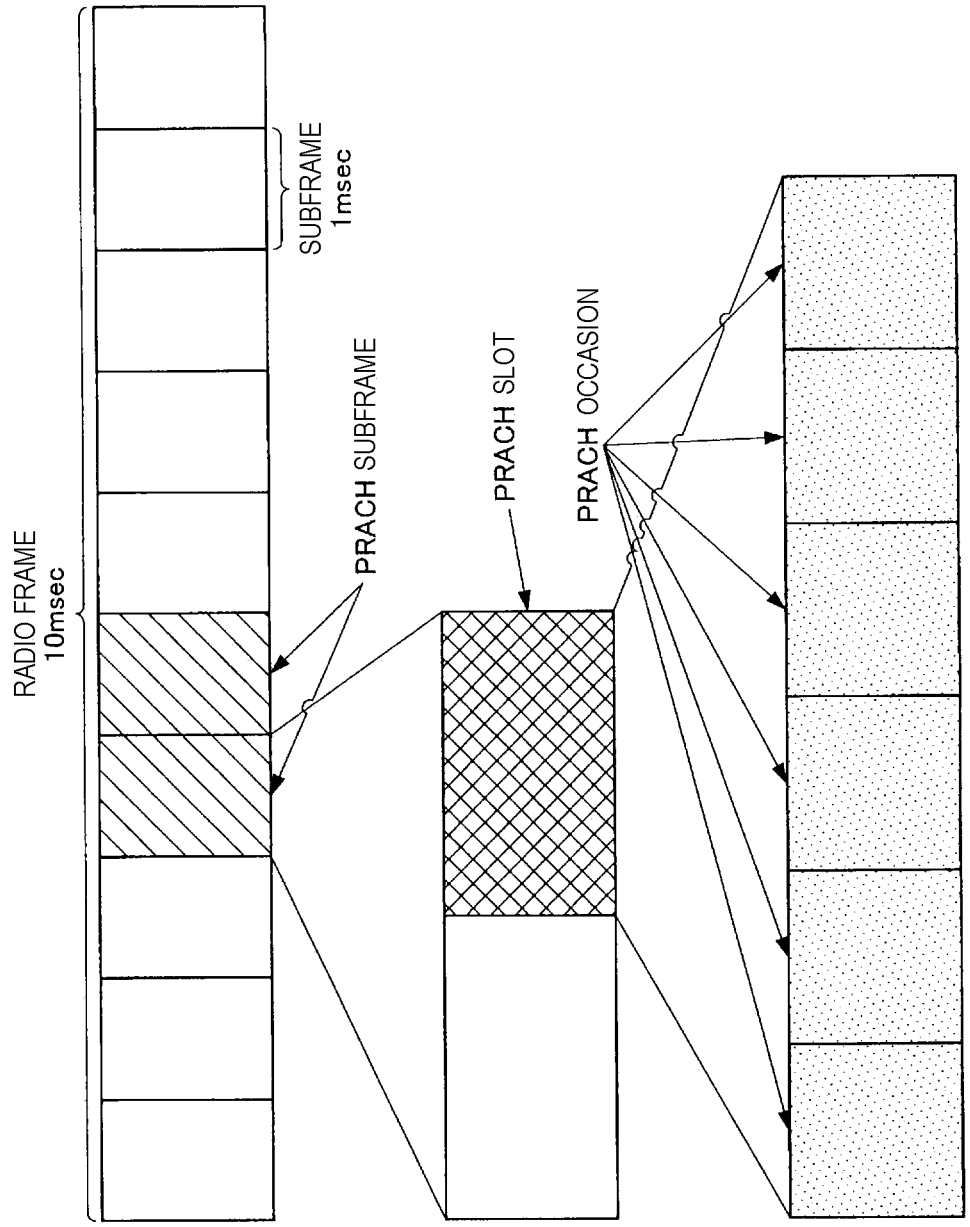
FIG. 7 is an explanatory diagram illustrating a PRACH occasion.

A PRACH occasion allowing transmission of the PRACH is set for the terminal device. FIG. 7 is an explanatory diagram illustrating the PRACH occasion. The PRACH occasion is included in a PRACH slot included in a PRACH subframe. The PRACH subframe is a subframe in which the PRACH can be transmitted. A maximum of two PRACH slots can be set inside the PRACH subframe. Furthermore, a maximum of seven PRACH occasions can be set inside the PRACH slot. The resource position of the PRACH occasion is determined according to the PRACH configuration index, the PRACH sequence length, and the PRACH subcarrier spacing.

The PRACH is transmitted with the PRACH occasion. The PRACH occasion is indicated by setting regarding the PRACH. The terminal device selects one of the PRACH occasions and transmits the PRACH. Further, the terminal device in the connection mode transmits the PRACH using the PRACH resource. The PRACH resource is combination of the PRACH preamble and its physical resource. The base station device can instruct the terminal device about the PRACH resource.

Types of sequences of the preamble of the PRACH are numbered. Numbers of the types of the sequences of the preamble will be referred to as preamble indexes.

The PRACH is retransmitted when a random access procedure is failed. The terminal device causes transmission of the PRACH to wait during a waiting period calculated from a back-off value (back-off indicator, BI) upon retransmission. Note that the back-off value may be different in accordance with a terminal category of the terminal device or priority of traffic which has occurred. In this event, a notification of a plurality of back-off values is made, and the terminal device selects a back-off value to be used in accordance with the priority. Also, when retransmitting the PRACH, the terminal device retransmits the PRACH using a higher transmission power compared to the initial transmission (this procedure is referred to as power ramping).

<Details of Random Access Response in Present Embodiment>

The NR random access response is transmitted using a PDSCH.

The PDSCH including the random access response is scheduled by the PDCCH in which a CRC is scrambled by an RA-RNTI. The PDCCH is arranged in Type1-PDCCH common search space. A value of the RA-RNTI is determined on the basis of transmission resources (time resources (slots or sub frames) and frequency resources (resource blocks)) of the PRACH corresponding to the random access response. The type1-PDCCH common search space is arranged to be set with parameters (ra-SearchSpace) in association with the search space of the random access.

The DMRS of the PDCCH whose CRC is scrambled by the RA-RNTI is quasi-co-located (QCL) with the SS/PBCH block. The terminal device can assume that the DMRS of the PDCCH whose CRC is scrambled by the RA-RNTI and the SS/PBCH block are being transmitted from the same antenna port of the base station device.

The random access response is information of MAC. The random access response includes at least an uplink grant for transmitting Message 3, a timing advance value to be used for adjusting uplink frame synchronization, a value of a temporal C-RNTI, a PRACH index used for PRACH transmission corresponding to the random access response, and information regarding back-off to be used for causing transmission of the PRACH to wait. The base station device transmits these kinds of information in the PDSCH. The terminal device determines whether or not transmission of the random access preamble has succeeded or has been failed from these kinds of information. In a case where it is determined from these kinds of information that transmission of the random access preamble has been failed, the terminal device preforms a transmission process of Message 3 in accordance with the information included in the random access response. Meanwhile, in a case where it is determined that transmission of the random access preamble has been failed, the terminal device regards the random access procedure as having been failed and performs a retransmission process of the PRACH.

<Details of Message 3 in Present Embodiment>

Message 3 is transmitted using the PUSCH. The PUSCH is transmitted using resources indicated by the random access response.

Message 3 includes the RRC connection request message.

A waveform of the transmitted NR-PUSCH including Message 3 is indicated by a parameter included in the system information. Specifically, OFDM or DFT-s-OFDM is determined by indication of the parameter.

The process of the base station device transitions to a transmission process of contention resolution in a case where the base station device normally receives Message 3. Meanwhile, in a case where the base station device cannot normally receive Message 3, the base station device can try reception of Message 3 again at least for a predetermined period.

In the case where Message 3 is not received correctly, Message 3 may be retransmitted. The resource for the retransmission of Message 3 is designated by the DCI of the PDCCH having an attached CRC scrambled by a temporary C-RNTI provided by the random access response corresponding to Message 3. The terminal device retransmits Message 3 on the basis of the designation by the uplink grant.

Note that, in a case where neither the contention resolution nor the instruction of retransmission of Message 3 can be received within a predetermined period, the terminal device regards the random access procedure as having been failed, and performs a retransmission process of the PRACH. The predetermined period is set by, for example, the system information. The predetermined period lasts from when a contention resolution timer is started until the contention resolution timer is exceeded.

<Details of Contention Resolution According to Present Embodiment>

The contention resolution is transmitted using the PDSCH.

The PDSCH including the contention resolution is scheduled by the PDCCH in which a CRC is scrambled by the temporal C-RNTI or the C-RNTI.

The terminal device returns a HARQ-ACK to the base station device using the PUCCH in a case where the terminal device normally receives the PDSCH including the contention resolution. Thereafter, the terminal device is put into a connected state by this random access procedure being regarded as succeeding. Meanwhile, in a case of receiving a NACK to the PDSCH including the contention resolution from the terminal device or in a case where there is no response, the base station device retransmits the PDSCH including the contention resolution. Further, in a case where the terminal device cannot receive the contention resolution of the NR within the predetermined period, the terminal device regards the random access procedure as having been failed, and performs a retransmission process of the PRACH. The predetermined period lasts from when a contention resolution timer is started until the contention resolution timer is exceeded.

<Details about Two-Step RACH Procedure According to Embodiment>

Figure 8:
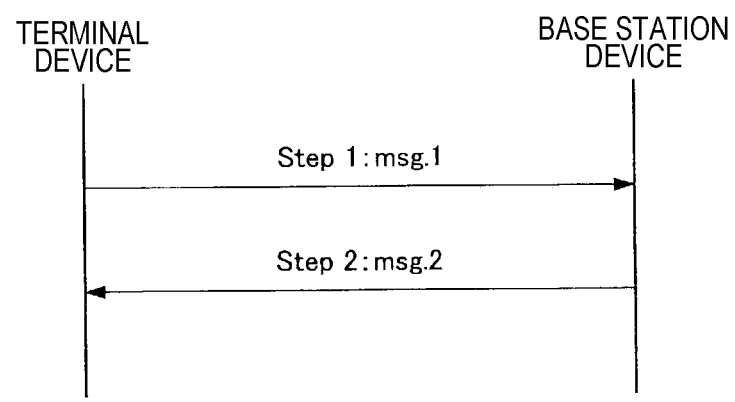
FIG. 8 is a flowchart illustrating a two-step RACH procedure.

The two-step RACH procedure according to the embodiment will be described. The two-step RACH procedure is a RAHC procedure in which the process is completed by the exchange of two messages. FIG. 8 is a flowchart illustrating the two-step RACH procedure.

In the two-step RACH procedure, the step by which the terminal device 200 performs an uplink transmission to the base station device 100 is defined as a first step (that is, Step 1 of the two-step RACH procedure). Additionally, the message transmitted on the uplink in the first step is also referred to as Message 1. The uplink message of the two-step RACH procedure and the uplink message of the four-step RACH procedure are typically different from each other.

For example, the information contained in the uplink message of the two-step RACH procedure and the information containing in the uplink message of the four-step RACH procedure may be different. The base station device 100 is capable of identifying whether the received message is the uplink message of the two-step RACH procedure or the uplink message of the four-step RACH procedure on the basis of the content of the received uplink message.

For example, a format of the uplink message of the two-step RACH procedure and a format of the uplink message of the four-step RACH procedure may be different. The base station device 100 is capable of identifying whether the received message is the uplink message of the two-step RACH procedure or the uplink message of the four-step RACH procedure on the basis of the format of the received uplink message.

In the two-step RACH procedure, the step by which the base station device 100 performs a downlink transmission to the terminal device 200 as a response to the uplink transmission in the first step is defined as a second step (that is, Step 2 of the two-step RACH procedure). Additionally, the message transmitted on the downlink in the second step is also referred to as Message 2. The downlink message of the two-step RACH procedure typically has different content or a different format from the downlink message of the four-step RACH procedure.

For example, the information contained in the downlink message of the two-step RACH procedure and the information containing in the downlink message of the four-step RACH procedure may be different. The terminal device 200 is capable of identifying whether the received message is the downlink message of the two-step RACH procedure or the downlink message of the four-step RACH procedure on the basis of the content of the received downlink message.

For example, a format of the uplink message of the two-step RACH procedure and a format of the downlink message of the four-step RACH procedure may be different. The terminal device 200 is capable of identifying whether the received message is the downlink message of the two-step RACH procedure or the downlink message of the four-step RACH procedure on the basis of the format of the received downlink message.

In the following, the content and format of Message 1 and Message 2 of the two-step RACH procedure as well as the flow of the two-step RACH procedure will be described in detail. In the following, unless specifically noted otherwise, Message 1 refers to Message 1 of the two-step RACH procedure, and Message 2 refers to Message 2 of the two-step RACH procedure.

(1) Message 1 of Two-Step RACH Procedure According to Embodiment (1.1) Content

Message 1 of the two-step RACH procedure may also be a message containing both Message 1 and Message 3 of the four-step RACH procedure. In addition, Message 1 of the two-step RACH procedure may also contain identification information indicating the terminal device 200.

(1.2) Format

A variety of formats are conceivable for Message 1.

PRACH+PUSCH

For example, the format of Message 1 may be a combination of the PRACH and the PUSCH. In other words, Message 1 may be transmitted using the PRACH and the PUSCH. The identification information indicating the terminal device 200 is expressed by the UE-ID field included in the PUSCH, and/or the PRACH preamble, and/or the RACH resource.

PUSCH

For example, the format of Message 1 may be the PUSCH. In other words, Message 1 may be transmitted using the PUSCH only. The identification information indicating the terminal device 200 is expressed by the UE-ID field included in the PUSCH, and/or the RACH resource.

PRACH

For example, the format of Message 1 may be the PRACH. In other words, Message 1 may be transmitted using the PRACH only. The identification information indicating the terminal device 200 is expressed by the PRACH preamble and/or the RACH resource.

(1.3) Repeated Transmission

The terminal device 200 may also transmit Message 1 repeatedly until Message 2 is received. In this case, the terminal device 200 may transmit Message 1 repeatedly using both the PRACH and the PUSCH. Also, the terminal device 200 may transmit Message 1 using the PRACH at first, and thereafter transmit Message 1 repeatedly using the PUSCH. In any case, by repeatedly transmitting Message 1, the reliability of receiving Message 1 at the base station device 100 can be improved.

(1.4) Non-Orthogonal Multiple Access (NOMA) Transmission

The PUSCH transmitted by Message 1 may also be non-orthogonally multiplexed. Non-orthogonal multiple access is a multiple access method in which some or all physical resources (frequency resources and time resources) used by the physical channels of a plurality of terminal devices overlap. The PUSCH may be multiplied by a predetermined interleave code or spread code, for example. Alternatively, the PUSCH may be transmitted repeatedly at the bit level. The base station device may decode a plurality of physical channels using the same physical resource by performing a non-orthogonal multiple access decoding process.

(1.5) Message 1 Resources

The resources that may be used to transmit Message 1 of the two-step RACH procedure (the occasion for Message 1 of the two-step RACH procedure) is designated by the base station device. The terminal device transmits Message 1 using a resource among the designated resources.

The PRACH of Message 1 of the two-step RACH procedure and the PRACH of the four-step RACH procedure are set by the base station device such that at least one of the physical resources (frequency resources and time resources) and the PRACH preamble is different.

An example of setting the occasion for Message 1 will be described.

The occasion for Message 1 of the two-step RACH procedure is not superimposed on the PRACH occasion. The occasion for Message 1 and the PRACH occasion are set independently.

An example of setting the occasion for Message 1 will be described.

Resources that can be used to transmit the PRACH in the occasion for Message 1 of the two-step RACH procedure are shared with the PRACH occasion. In this case, the set of PRACH preambles that can be used in the two-step RACH procedure and the set of PRACH preambles that can be used in the four-step RACH procedure are preferably independent. Preferably, no PRACH preamble is included in both the set of PRACH preambles for the two-step RACH procedure and the set of PRACH preambles for the four-step RACH procedure.

(2) Message 2 of Two-Step RACH Procedure According to Embodiment (2.1) Content

Message 2 of the two-step RACH procedure may also be a message containing both Message 2 and Message 4 of the four-step RACH procedure. In addition, Message 1 of the two-step RACH procedure may also be response information in association with the terminal device 200.

(2.2) Format

A variety of formats are conceivable for Message 2. Message 2 is preferably transmitted using the PDSCH scheduled by the PDCCH.

RA-RNTI

The PDCCH that schedules the transmission of Message 2 may also be transmitted in association with the RA-RNTI. For example, the CRC of the PDCCH that schedules the transmission of Message 2 may also be scrambled by the RA-RNTI and transmitted.

Note that the RA-RNTI used in the two-step RACH procedure may be a different RA-RNTI from the RA-RNTI used in the four-step RACH procedure. For example, the RA-RNTI used in the two-step RACH procedure may be calculated by including a predetermined offset value with respect to the RA-RNTI used in the four-step RACH procedure. From the difference between the RA-RNTIs, the terminal device can recognize whether a response from the base station device is the four-step RACH or the two-step RACH.

C-RNTI

The PDCCH that schedules the transmission of Message 2 may also be transmitted in association with the C-RNTI. For example, the CRC of the PDCCH that schedules the transmission of Message 2 may also be scrambled by the C-RNTI and transmitted.

Note that the C-RNTI is preset by the base station device.

Terminal Device Identifier Other than C-RNTI

The PDCCH that schedules the transmission of Message 2 may also be transmitted in association with a terminal device identifier other than the C-RNTI. Such an identifier may be an identifier such as a unique identification number assigned to the subscriber identity module (SIM) or the S-TMSI, for example.

(3) Process Flows

FIG. 8 is a sequence diagram illustrating an example of the flow of the two-step RACH procedure according to the embodiment. As illustrated in FIG. 8, the terminal device 200 transmits Message 1 of the two-step RACH procedure to the base station device 100. This Message 1 contains a random access preamble and an RRC message for an RRC connection request, for example. Next, the base station device 100 transmits Message 2 of the two-step RACH procedure to the terminal device 200. This Message 2 contains a random access response, for example.

According to the two-step RACH procedure illustrated in FIG. 8, compared to the four-step RACH procedure illustrated in FIG. 5, the number of steps (that is, the number of messages) is decreased from four steps to two steps, and therefore the latency of the RACH procedure as a whole can be reduced.

The two-step RACH procedure is particularly beneficial in unlicensed bands. Specifically, in the case where the four-step RACH procedure is performed in an unlicensed band, channel access occurs four times. On the other hand, in the case where the two-step RACH procedure is performed in an unlicensed band, channel access only occurs twice. In this way, compared to the four-step RACH procedure, the two-step RACH procedure makes it possible to reduce the channel access frequency in unlicensed bands.

<Channel Access Procedure of Unlicensed Channel>

The channel access (Listen Before Talk) procedure is performed by the base station device or the terminal device to access an unlicensed channel for transmission.

Channel sensing is performed once or multiple times in the channel access procedure. Determination (vacancy determination) as to whether a channel is idle (unoccupied, available, or enable) or busy (occupied, unavailable, or disable) is made on the basis of a result of the sensing. The power of the channel in a predetermined latency is sensed in the channel sensing.

Examples of the latency in the channel access procedure include a first latency (slot), a second latency, and a third latency (defer period), a fourth latency.

A slot is the unit of latency of a base station device and a terminal device in the channel access procedure. The slot is defined as, for example, 9 microseconds.

A single slot is inserted at the beginning of the second latency. The second latency is defined as, for example, 16 microseconds.

A defer period includes the second latency and a plurality of consecutive slots following the second latency. The number of the plurality of consecutive slots following the second latency is determined on the basis of a priority class (channel access priority class) to be used to satisfy QoS.

The fourth latency includes the second latency and a single slot following the second latency.

The base station device or the terminal device senses a predetermined channel during a period of a predetermined slot. The predetermined slot is considered idle in a case where the base station device or the terminal device detects power smaller than a predetermined power detection threshold for at least 4 microseconds in the period of the predetermined slot. Meanwhile, in a case where the detected power is larger than the predetermined power detection threshold, the predetermined slot is considered busy.

The channel access procedures include a first channel access procedure and a second channel access procedure. The first channel access procedure is performed by use of a plurality of slots and the defer period. Furthermore, the second channel access procedure is performed by use of the single fourth latency.

Parameters related to channel access are determined on the basis of the priority class. Examples of the parameters related to channel access include a minimum contention window, a maximum contention window, a maximum channel exclusivity time, and values that the contention window may take. The priority class is determined by a QoS class identifier (QCI) that processes quality of service (QoS). A correspondence table between the priority class and parameters related to channel access is illustrated in Table 1, and an example of a mapping between the priority class and the QCI is illustrated in Table 2.

TABLE 1

Example of correspondence relationships between priority class and parameters related to channel access

| Channel access priority class (p) | $m_p$ | Minimum contention window $CW_{min,p}$ | Maximum contention window $CW_{max,p}$ | Maximum channel exclusivity time $T_{mcot,p}$ | Values that contention window $CW_p$ may take |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 2

Example of mapping between priority class and

| Channel access priority class (p) | QCI |
|---|---|
| 1 | 1, 3, 5, 65, 66, 69, 70 |
| 2 | 2, 7 |
| 3 | 4, 6, 8, 9 |
| 4 | Other than above |

<Details of First Channel Access Procedure>

Procedures set forth below are performed in the first channel access procedure.

(0) Channel sensing is performed in the defer period. In a case where the channel is idle in a slot within the defer period, the process proceeds to step (1). Otherwise, the process proceeds to step (6).

(1) A counter initial value is acquired. Possible values of the counter initial value are integers between 0 and a contention window CW. Furthermore, the counter initial value is randomly determined in accordance with a uniform distribution. Then, the initial value of a counter N is set to the acquired counter initial value, and the process proceeds to step (2).

(2) In a case where a value of the counter N is larger than 0 and decrement of the counter N has been selected, the counter N is decremented by 1. Thereafter, the process proceeds to step (3).

(3) The process shifts to a standby state after a slot period is added. Furthermore, the channel is sensed in the additional slot. In a case where the additional slot is idle, the process proceeds to step (4). Otherwise, the process proceeds to step (5).

(4) In a case where the counter N indicates 0, this procedure is stopped. Otherwise, the process proceeds to step (2).

(5) The process shifts to a standby state after a defer period is added. Furthermore, the channel is sensed until it is detected that any one of slots included in the added defer period is busy, or until it is detected that all the slots included in the added defer period are idle. Thereafter, the process proceeds to step (6).

(6) In a case where it is sensed that the channel is idle in all the slots included in the added defer period, the process proceeds to step (4). Otherwise, the process proceeds to step (5).

After step (4) is stopped in the above procedure, transmission including data is performed on the channel by use of PDSCH, PUSCH, or the like.

Note that transmission need not be performed on the channel after step (4) is stopped in the above procedure. In this case, it is possible to then perform transmission without performing the above procedure, in a case where the channel is idle in all of the slots and the defer periods immediately before transmission. Meanwhile, in a case where the channel is not idle in any of the slots and the defer periods, the process proceeds to step (1) of the above procedure after it is sensed that the channel is idle in all the slots in the added defer period.

<Details of Second Channel Access Procedure>

In the second channel access procedure, transmission may be performed immediately after the channel is considered idle as a result of sensing in at least the fourth latency. Meanwhile, in a case where the channel is not considered idle as a result of the sensing in at least the fourth latency, no transmission is performed.

<Contention Window Adaptive Procedure>

A contention window CW to be used in the first channel access procedure is determined on the basis of the contention window adaptive procedure.

The value of the contention window CW is held for each priority class. Furthermore, the contention window CW takes a value between a minimum contention window and a maximum contention window. The minimum contention window and the maximum contention window are determined on the basis of the priority class.

Adjustment of the value of the contention window CW is performed prior to step (1) in the first channel access procedure. The value of the contention window CW is increased in a case where the rate of NACKs is higher than a threshold in at least a HARQ response corresponding to a reference subframe in the contention window adaptive procedure or a shared channel in a reference HARQ process. Otherwise, the value of the contention window CW is set to the minimum contention window.

The value of the contention window CW is increased on the basis of, for example, the following equation: $CW=2\cdot(CW+1)-1$.

<Details of Channel Access Procedure in Downlink>

In a case of performing downlink transmission including PDSCH, PDCCH, and/or EPDCCH in an unlicensed channel, a base station device accesses the channel to perform the downlink transmission on the basis of the first channel access procedure.

Meanwhile, in a case of performing downlink transmission not including PDSCH but including DRS in an unlicensed channel, the base station device accesses the channel to perform the downlink transmission on the basis of the second channel access procedure. Note that it is preferable that the duration of the downlink transmission be smaller than 1 millisecond.

<Details of Channel Access Procedure in Uplink>

In a case where there is an instruction to perform the first channel access procedure in an uplink grant for scheduling PUSCH in an unlicensed channel, a terminal device performs the first channel access procedure prior to uplink transmission including the PUSCH.

Further, in a case where there is an instruction to perform the second channel access procedure in an uplink grant for scheduling PUSCH, a terminal device performs the second channel access procedure prior to uplink transmission including the PUSCH.

In addition, the terminal device performs the second channel access procedure for uplink transmission not including PUSCH but including SRS, prior to the uplink transmission.

Furthermore, in a case where the end of uplink transmission specified in the uplink grant is within uplink duration (UL duration), the terminal device performs the second channel access procedure prior to the uplink transmission, regardless of the type of procedure specified in the uplink grant.

Moreover, in a case where uplink transmission is performed after the fourth latency following the completion of downlink transmission from the base station, the terminal device performs the second channel access procedure prior to the uplink transmission.

<NR Channel Access Procedure According to Embodiment>

In the channel access procedure for an unlicensed channel using NR, channel sensing without beamforming and channel sensing with beamforming are performed.

Channel sensing without beamforming is channel sensing by receiving without controlling the directivity, or channel sensing that lacks direction information. Channel sensing that lacks direction information refers to channel sensing in which the measurement results from all directions are averaged, for example. The transmitting station does not have to be aware of the directivity (angle, direction) used by the channel sensing.

Channel sensing with beamforming is channel sensing by receiving while controlling the directivity, or channel sensing that has direction information. In other words, channel sensing with beamforming is channel sensing in which the reception beam is pointed in a predetermined direction. A transmitting station having the function of performing channel sensing with beamforming can perform channel sensing one or more times using different directivity.

By performing channel sensing with beamforming, the area to be detected by sensing is narrowed. With this arrangement, the transmitting station can decrease the frequency of detecting non-interfering communication links and reduce the exposed node problem.

1.2. Circumstances

In an NR unlicensed band (NR-U), a variety of use cases are expected to be supported, including not only Licensed Assisted Access (LAA) using the mechanism of carrier aggregation, but also dual connectivity, standalone operation in unlicensed bands only, and cases where one of either the DL carrier or the UL carrier is in a licensed band while the other is in an unlicensed band (for example, licensed DL and unlicensed UL).

To support these use cases, in an NR-U, the ability to transmit physical channels and physical signals transmitted by a primary cell (PCell), a primary secondary cell (PSCell), or a special cell (SpCell), such as the synchronization signal (SS), the PRACH, and PUCCH, in unlicensed bands is necessary.

Generally, in an unlicensed band, a communication device performs channel sensing and determines whether the channel is clear or busy before transmitting a physical channel and/or a physical signal. In the case where the channel is clear (LBT success), the communication device can transmit a physical channel and/or a physical signal. On the other hand, in the case where the channel is busy (LBT failure), the communication device cannot transmit a physical channel and/or a physical signal.

It is conceivable that Messages 1, 2, 3, and 4 in the RACH procedure for the PRACH or the like may not be transmittable due to LBT failure. For example, in the case where another nearby access point has been using the channel, the communication device may determine that the channel is busy and be unable to transmit due to the hidden node problem.

Figure 9:
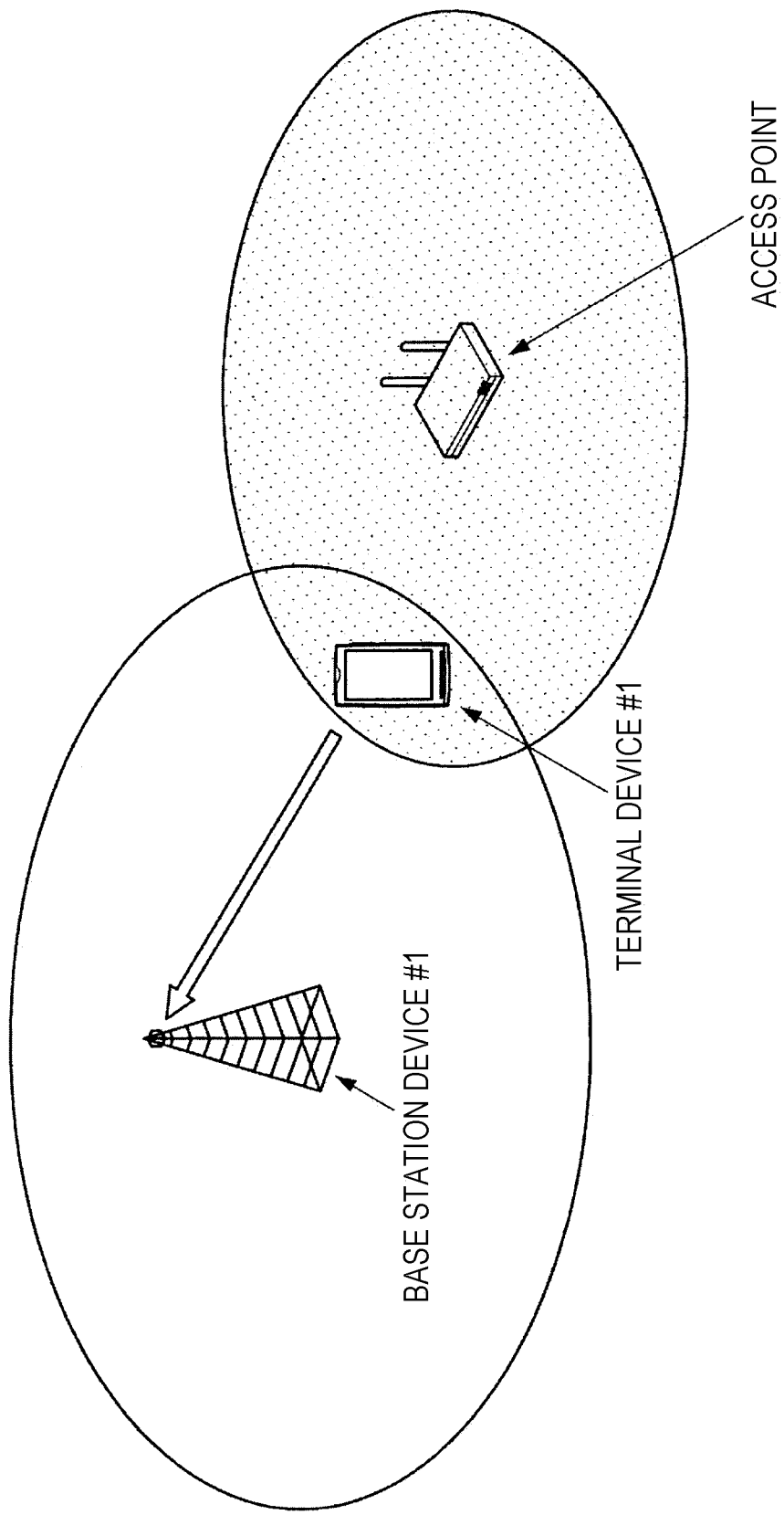
FIG. 9 is an explanatory diagram illustrating a situation in which an access point exists near a terminal device, and the access point is using the channel.
Figure 10:
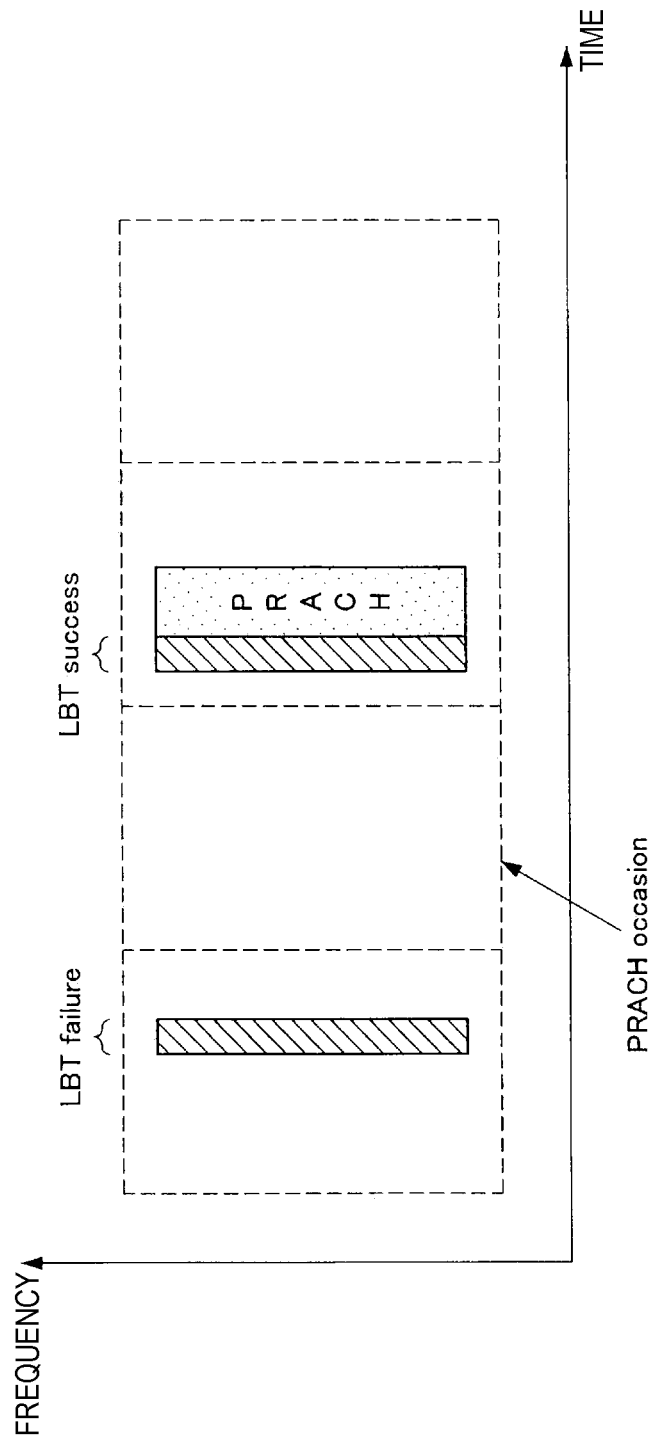
FIG. 10 is an explanatory diagram illustrating a situation in which the communication device is unable to transmit the PRACH due to LBT failure, and at a later timing, the communication device successfully transmits the PRACH due to an LBT success.

FIG. 9 is an explanatory diagram illustrating a situation in which an access point exists near a terminal device, and the access point is using the channel. FIG. 10 is an explanatory diagram illustrating a situation in which the communication device is unable to transmit the PRACH due to LBT failure, and at a later timing, the communication device successfully transmits the PRACH due to an LBT success.

Messages 1, 2, 3, and 4 are used during the RACH procedure. The RACH procedure is always performed during the initial access. In the case where a delay occurs in the transmission of Messages 1, 2, 3, and 4, a failure of the RACH procedure is recognized, and a cell connection is not established. This factor leads to instability of the communication link.

Accordingly, the author of the present disclosure has studied the points described above and investigated technology enabling resources to be used efficiently in an NR-U. As a result, as described hereinafter, the author of the present disclosure proposes a technology enabling resources to be used efficiently in an NR-U by allowing the RACH procedure to be successful when LBT failure occurs.

1.3. Configuration Examples

Figure 11:
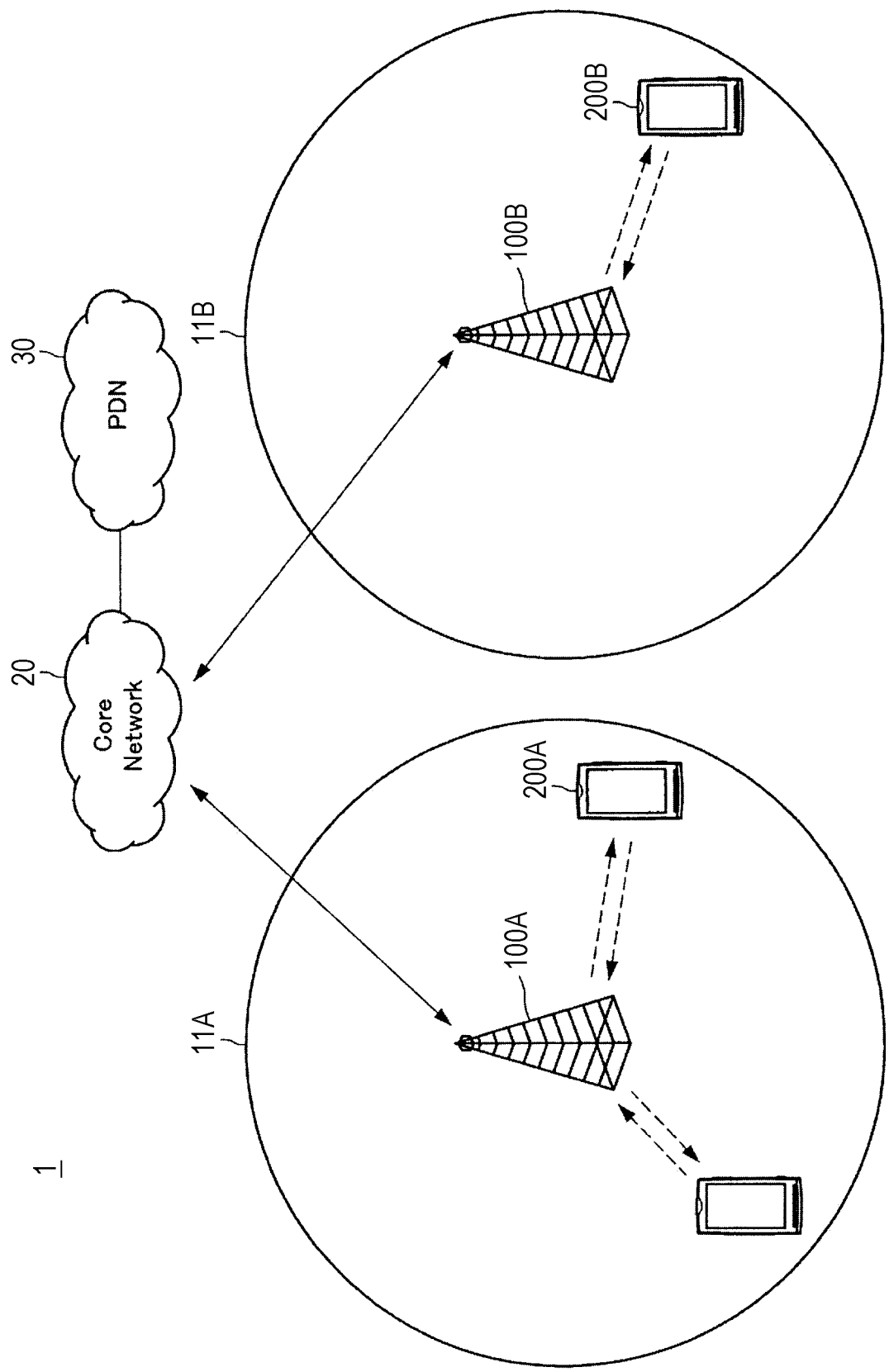
FIG. 11 is a diagram illustrating an example of an overall configuration of a system according to an embodiment of the present disclosure.

FIG. 11 is a diagram illustrating an example of an overall configuration of a system 1 according to an embodiment of the present disclosure. As illustrated in FIG. 11, the system 1 includes base station devices 100 (100A and 100B), terminal devices 200 (200A and 200B), a core network 20, and a packet data network (PDN) 30.

The base stations devices 100 operate cells 11 (11A or 11B), and provide wireless service to one or more terminal devices positioned inside the cells 11. For example, the base station device 100A provides wireless service to the terminal device 200A, and the base station device 100B provides wireless service to the terminal device 200B. The cells 11 may be operated in accordance with any wireless communication method, such as LTE or New Radio (NR) for example. The base station devices 100 are connected to the core network 20. The core network 20 is connected to the PDN 30.

The core network 20 may include a Mobility Management Entity (MME), a Serving Gateway (S-GW), a PDN Gateway (P-GW), a Policy and Charging Rules Function (PCRF), and a Home Subscriber Server (HSS). Alternatively, the core network 20 may include an NR entity having functions similar to the above. The MME is a control node that handles signals in the control plane, and manages the mobility state of terminal devices. The S-GW is a control node that handles signals in the user plane, and is a gateway device that switches the forwarding path for user data. The P-GW is a control node that handles signals in the user plane, and is a gateway device that acts a connecting point between the core network 20 and the PDN 30. The PCRF is a control node that controls behavior related to policies such as quality of service (QoS) for bearers, and also charging. The HSS is a control node that handles subscriber data and service control.

The terminal devices 200 wirelessly communicate with the base station devices 100 on the basis of control by the base station devices 100. The terminal devices 200 may be what is referred as user equipment (UE), but may also be relay nodes that relay transmissions to other terminal devices. For example, the terminal devices 200 transmit uplink signals to the base station devices 100 and receive downlink signals from the base station devices 100.

In the present embodiment in particular, the base station devices 100A and 100B are managed by respectively different operators. For example, the base station device 100A is managed by an operator A while the base station device 100B is managed by an operator B. Additionally, the base station devices 100A and 100B share the use of radio resources that are shareable between the respectively managing operators to provide wireless communication services.

Next, configuration examples of the base station devices 100 and the terminal devices 200 according to an embodiment of the present disclosure will be described.

Figure 12:
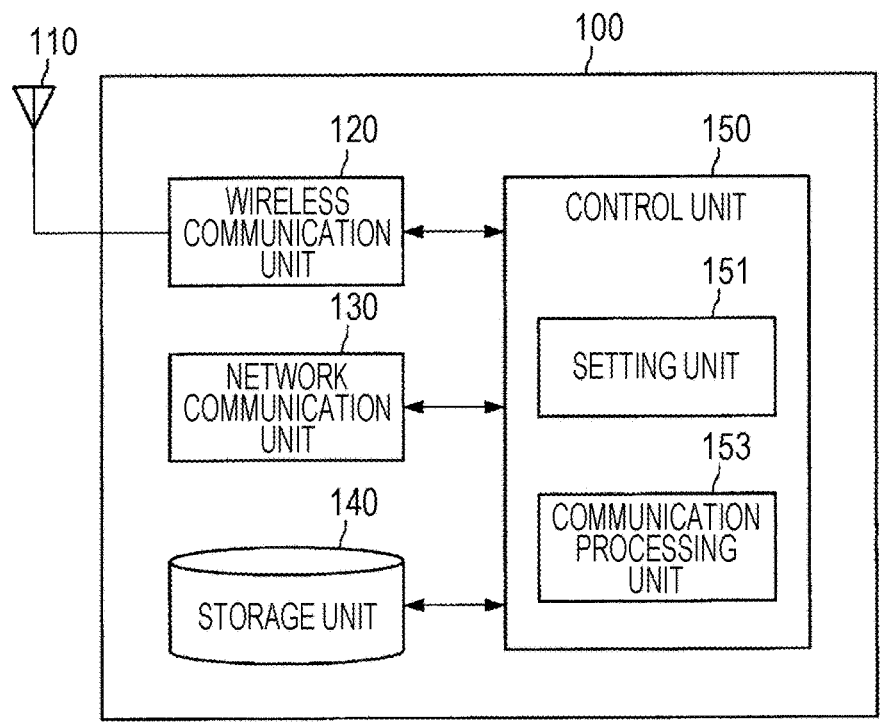
FIG. 12 is a block diagram illustrating an example of the configuration of a base station device according to the embodiment.

FIG. 12 is a block diagram illustrating an example of the configuration of a base station device 100 according to the embodiment. Referring to FIG. 12, the base station device 100 includes an antenna unit 110, a wireless communication unit 120, a network communication unit 130, a storage unit 140, and a control unit 150.

(1) Antenna Unit 110

The antenna unit 110 emits a signal output from the wireless communication unit 120, as radio waves in the air. Furthermore, the antenna unit 110 converts radio waves in the air into a signal, and outputs the signal to the wireless communication unit 120.

(2) Wireless Communication Unit 120

The wireless communication unit 120 transmits and receives signals. For example, the wireless communication unit 120 transmits a downlink signal to a terminal device, and receives an uplink signal from the terminal device.

(3) Network Communication Unit 130

The network communication unit 130 transmits and receives information. For example, the network communication unit 130 transmits information to other nodes, and receives information from other nodes. Examples of the other nodes described above include another base station and a core network node.

(4) Storage Unit 140

The storage unit 140 temporarily or permanently stores a program and various data for operation of the base station device 100.

(5) Control Unit 150

The control unit 150 controls the operation of the base station device 100 as a whole to provide the various functions of the base station device 100. The control unit 150 includes a setting unit 151 and a communication processing unit 153.

The setting unit 151 has a function of setting settings related to communication with the terminal devices 200.

The communication processing unit 153 has a function of performing a process of communicating with the terminal devices 200.

The control unit 150 additionally may include other constituent elements besides the above constituent elements. In other words, the control unit 150 may also perform operations other than the operations of the above constituent elements.

Figure 13:
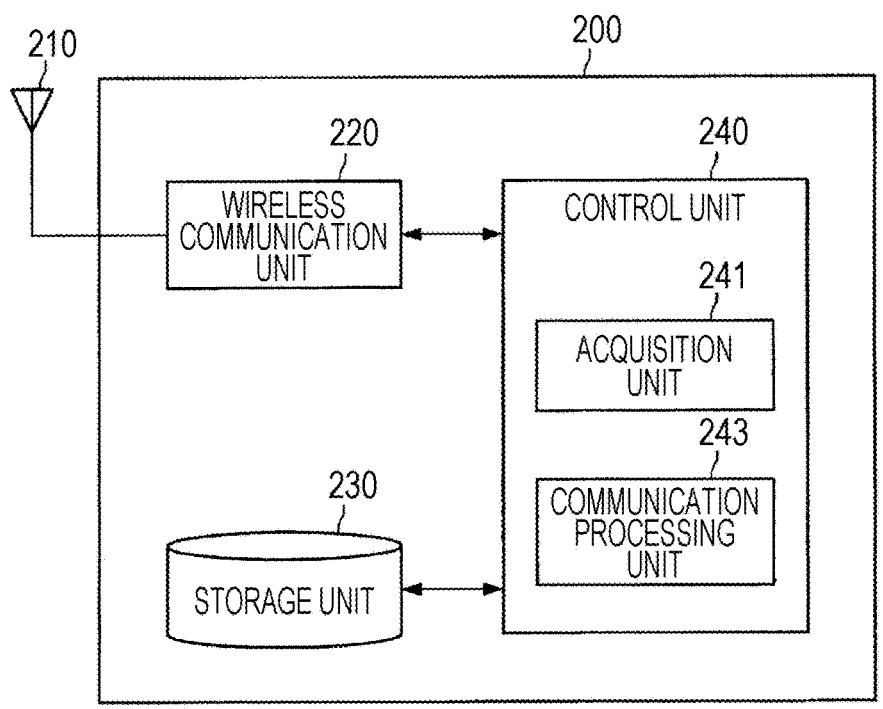
FIG. 13 is a block diagram illustrating an example of the configuration of a base station device according to the embodiment.

FIG. 13 is a block diagram illustrating an example of the configuration of a terminal device 200 according to the embodiment. Referring to FIG. 13, the terminal device 200 includes an antenna unit 210, a wireless communication unit 220, a storage unit 230, and a control unit 240.

(1) Antenna Unit 210

The antenna unit 210 emits a signal output from the wireless communication unit 220, as radio waves in the air. Furthermore, the antenna unit 210 converts radio waves in the air into a signal, and outputs the signal to the wireless communication unit 220.

(2) Wireless Communication Unit 220

The wireless communication unit 220 transmits and receives signals. For example, the wireless communication unit 220 receives a downlink signal from a base station, and transmits an uplink signal to the base station.

(3) Storage Unit 230

The storage unit 230 temporarily or permanently stores a program and various data for operation of the terminal device 200.

(4) Control Unit 240

The control unit 240 controls the operation of the terminal device 200 as a whole to provide the various functions of the terminal device 200. The control unit 240 includes an information acquisition unit 241 and a communication processing unit 243.

The information acquisition unit 241 has a function of acquiring information from signals obtained from radio waves received by the antenna unit 210.

The communication processing unit 243 has a function of performing a process of communicating with the base station device 100.

The control unit 240 additionally may include other constituent elements besides the above constituent elements. In other words, the control unit 240 may also perform operations other than the operations of the above constituent elements.

Configuration examples of the base station devices 100 and the terminal devices 200 according to an embodiment of the present disclosure have been described above. Next, operations of the base station devices 100 and the terminal devices 200 according to an embodiment of the present disclosure will be described.

1.4. Operation Examples

Hereinafter, a method of improving the RACH procedure when the base station device 100 and the terminal device 200 perform wireless communication using an unlicensed band will be described. In the embodiment, a plurality of PRACH resources can be allocated. For example, the base station device 100 can allocate a plurality of PRACHs in frequency and/or time resources to the terminal device 200. Note that in the embodiment, the terminal device 200 may execute LBT in the communication processing unit 243. Consequently, the communication processing unit 243 may function as an example of a determination unit according to the present disclosure.

(1) Countermeasure for LBT Failure of Message 1

Figure 14:
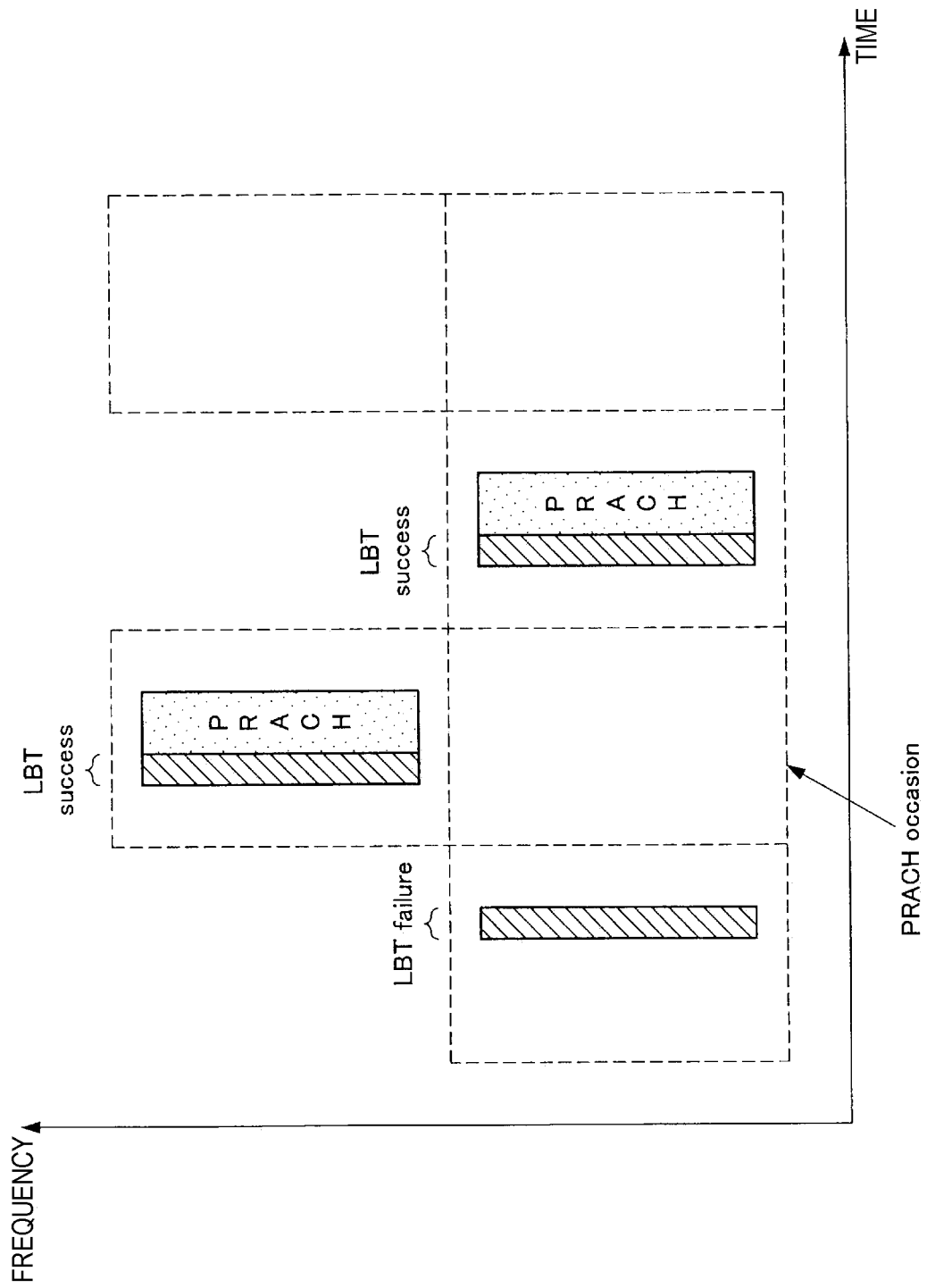
FIG. 14 is an explanatory diagram illustrating an example of resources for transmitting Message 1.

First, a countermeasure for LBT failure of Message 1 will be described. As a countermeasure for LBT failure of Message 1, the base station device 100 may designate the resource for transmitting Message 1 dynamically, and resources for transmitting Message 1 plurally in different frequency ranges may also be provided. FIG. 14 is an explanatory diagram illustrating an example of resources for transmitting Message 1. In the case where the terminal device 200 executes LBT in an attempt to transmit Message 1 but fails, the terminal device 200 uses one resource from among resources designated by the base station device 100 or the resources for transmitting Message 1 plurally. The terminal device 200 executes LBT again, and in a case where LBT is successful, the terminal device 200 transmits the PRACH.

In the case where the base station device 100 designates resources for transmitting Message 1 dynamically, the base station device 100 gives notice of the PRACH resources inside the channel occupancy time (COT) in the DCI. The base station device 100 may also give notice using the slot format indicator (SFI). In the case where the PRACH resource is set semi-statically and the uplink range indicated by the SFI is overlapping, the terminal device 200 is capable of transmitting the PRACH. Alternatively, in the case where the PRACH range (PRACH occasion) is indicated by the SFI, the terminal device 200 is capable of using the resource to transmit the PRACH. The SFI is included in the DCI of the PDCCH (common PDCCH) transmitted in the common search space of the terminals. Additionally, the base station device 100 may also explicitly give notice of whether or not transmission is possible with a target resource. In this case, the base station device 100 may designate the target resource with the common PDCCH.

The normal PRACH configuration is basically the same as the operation of the PDCCH order in the common case. That is, the terminal device performs contention-based random access unless the PDCCH related to PRACH transmission described above is received. On the other hand, in the case where different dynamic PRACH configurations are set, if the DCI cannot be received, the target resource cannot be used as the PRACH resource.

In the case of transmitting with a resource after the PRACH resource in the COT, the terminal device 200 executes LBT when the resource is usable. LBT in this case is Category 2 LBT or Category 4 LBT of channel access priority class 1. On the other hand, when the resource is unusable, the terminal device 200 releases the channel. After that, the base station device 100 and the terminal device 200 executes Category 4 LBT again.

(2) Countermeasure for LBT Failure of Message 2

Next, a countermeasure for LBT failure of Message 2 will be described. As a countermeasure for LBT failure in Message 2, the duration of the random access response (RAR) window may be extended, or a plurality of RAR windows may be provided. Specifically, the duration of the RAR window is extended to be settable to 10 msec or longer.

The RACH procedure has a two-step procedure and a four-step procedure. For Message 1 in the four-step procedure, it is desirable for the terminal device 200 to execute Category 4 LBT of channel access priority class 1 when outside the channel occupancy time (COT), and to execute Category 2 LBT or not execute LBT when inside the COT. For Message 1 in the two-step procedure, it is desirable for the terminal device 200 to execute Category 4 LBT when outside the channel occupancy time (COT), and to execute Category 2 LBT or not execute LBT when inside the COT.

In the case where a plurality of resources is set in different frequency ranges for the RACH procedure, the carriers of Message 1 and Message 3 may be different. The carrier of Message 1 is selected by the terminal device 200, while the carrier of Message 3 may be the same as Message 1, designated by the base station device 100 in Message 2, or selected by the terminal device 200 after a plurality of candidates is designated by the base station device 100.

Additionally, the terminal device 200 may also execute RACH procedures in parallel. In other words, a plurality of RACH procedures with different HARQ processes is executed between the base station device 100 and the terminal device 200.

Figure 15:
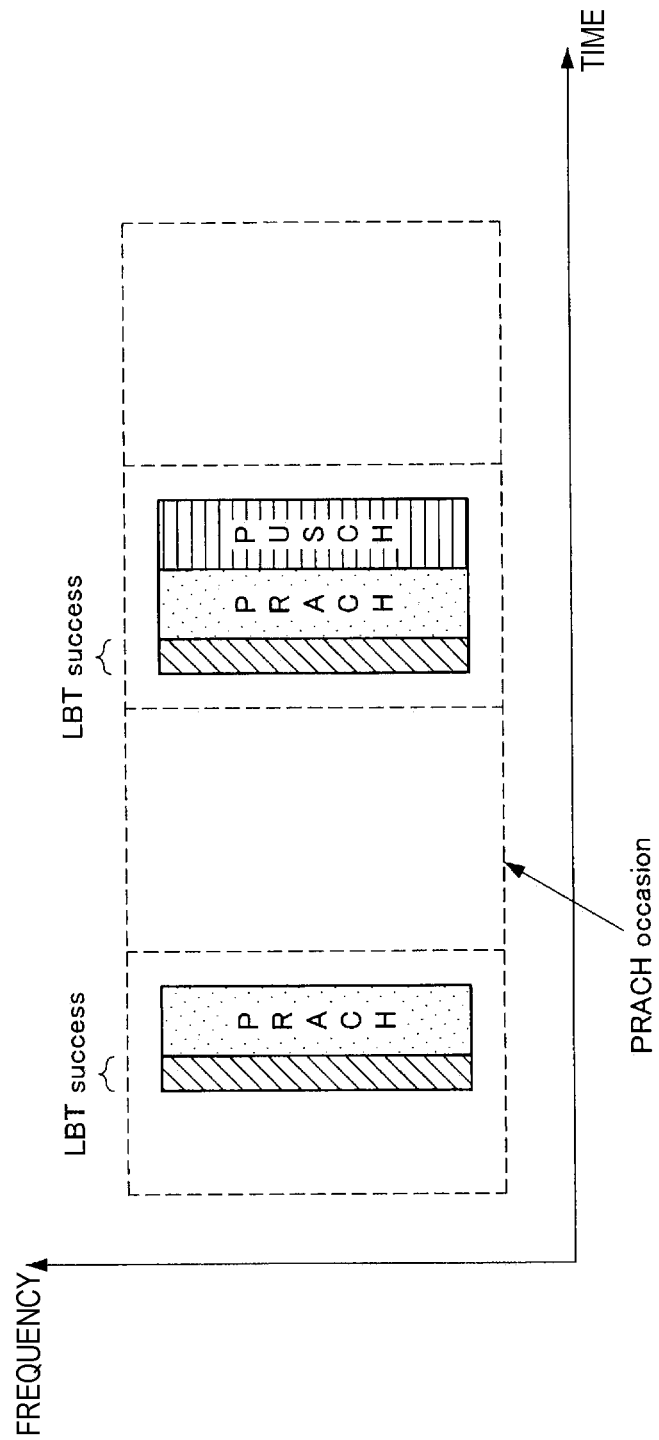
FIG. 15 is an explanatory diagram illustrating an example of a two-step RACH procedure.

Next, a refinement of the RACH procedure using an NR unlicensed band will be described. FIG. 15 is an explanatory diagram illustrating an example of the two-step RACH procedure. A new setting may be provided for the two-step RACH procedure using an NR unlicensed band. The new setting may be indicated by the base station device 100 in a system information block (SIB) for an NR unlicensed band.

The terminal device 200 needs to distinguish whether to perform the two-step RACH procedure or to perform the four-step RACH procedure. The terminal device 200 may distinguish whether to perform the two-step RACH procedure or to perform the four-step RACH procedure according to the Radio Network Temporary Identifier (RNTI). The RA-RNTI of Message 2 in the two-step RACH procedure transmitted from the base station device 100 is different from the RA-RNTI of Message 2 in the four-step RACH procedure. Consequently, the terminal device 200 can distinguish between the procedures according to the RNTI.

Additionally, the terminal device 200 may also distinguish whether to perform the two-step RACH procedure or to perform the four-step RACH procedure according to differences in the Control Resource Set (CORESET) or the search space. The CORESET or the search space in which the PDCCH having an attached CRC scrambled by the RA-RNTI is transmitted differs between the two-step RACH procedure and the four-step RACH procedure. Consequently, the terminal device 200 can distinguish between the procedures according to differences in the CORESET or the search space. Note that the CORESET is a physical resource range in which the PDCCH is transmitted. In the CORESET, the bandwidth, the number of symbols, and the period are set.

Additionally, the terminal device 200 may distinguish whether to perform the two-step RACH procedure or to perform the four-step RACH procedure according to the content of the DCI. The base station device 100 may give notice of whether to perform the two-step RACH procedure or to perform the four-step RACH procedure in the DCI field of the PDCCH having an attached CRC scrambled by the RA-RNTI. Consequently, the terminal device 200 can distinguish between the procedures according to the content of the DCI.

Additionally, the terminal device 200 may distinguish whether to perform the two-step RACH procedure or to perform the four-step RACH procedure according to the content contained in Message 2. In the four-step RACH procedure, Message 2 does not contain an uplink grant (UL grant) for Message 3. On the other hand, in the two-step RACH procedure, Message 2 does not contain an uplink grant for Message 3. In the two-step RACH procedure, the terminal device 200 replies to the base station device 100 with a HARQ for Message 2. Consequently, the terminal device 200 can distinguish between the procedures according to the content contained in Message 2.

In the RACH procedure using an NR unlicensed band, a plurality of resources for Message 3 may be set. By setting a plurality of resources for Message 3, the probability of the terminal device 200 transmitting Message 3 can be raised.

The setting of resources for Message 3 may be indicated by the base station device 100 in a plurality of uplink grants in Message 2.

Also, the setting of resources for Message 3 may be indicated by the base station device 100 in the uplink grant and the RACH configuration in Message 2. For example, a plurality of resources may be set by the base station device 100 according to a resources designated by an uplink grant and a designated resource offset. The offset is conceivably an offset in the time direction or an offset in the frequency (carrier) direction.

Also, the setting of resources for Message 3 may be indicated by the base station device 100 in a plurality of Message 2. In this case, a single Message 2 contains a single uplink grant.

Also, the setting of resources for Message 3 may be triggered from the base station device 100 by a resource transmittable in the DCI separately from an uplink grant in Message 2. This may be used particularly in the case of causing the terminal device 200 to transmit Message 3 inside the COT. In this case, an operation similar to the case where the base station device 100 designates the resource for transmitting Message 1 dynamically described above is performed. Furthermore, in this case, the base station device 100 can also designate the LBT type (first channel access procedure or second channel access procedure).

The terminal device 200 may also be configured not to execute power ramping if LBT failure occurs during the transmission of Message 1. Also, the terminal device 200 may be configured to control or not control power ramping if LBT failure occurs during the transmission of Message 2.

The PRACH may also be multiplexed with another uplink. For example, the PRACH and another uplink may be multiplexed by frequency-division multiplexing (FDM). In the case where FDM is available, a guard band may be provided. This is because tones spread due to a lack of synchronization. In the case where FDM is unavailable, only the PRACH spread over 20 MHz overall may be supported. In this case, only the short PUCCH may be supported, for example. The short PUCCH is the PUCCH configured with a maximum of two symbols.

Figure 16:
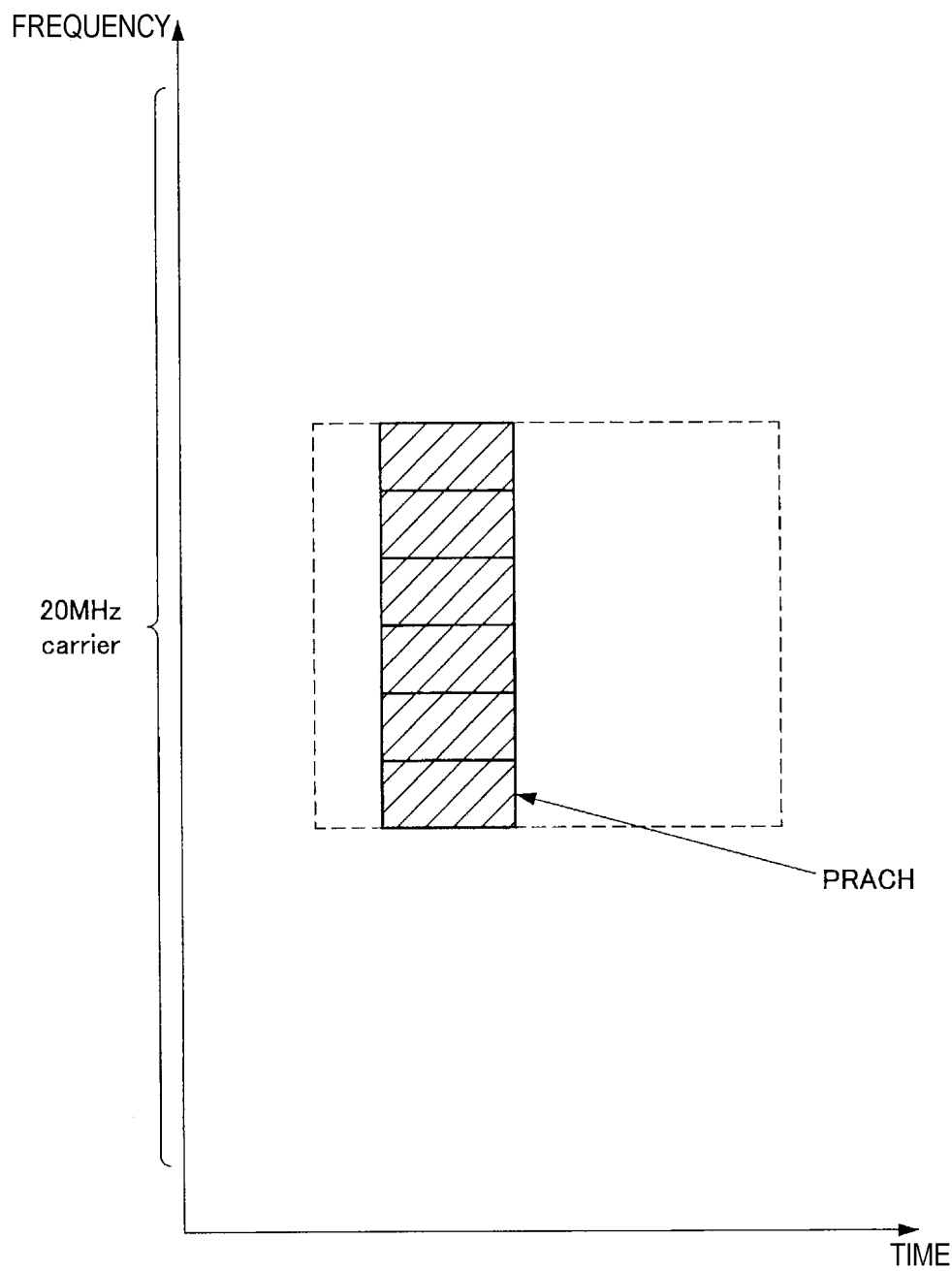
FIG. 16 is an explanatory diagram illustrating a configuration of the normal PRACH (in a licensed band).

Next, the configuration of the PRACH according to the embodiment will be described. First, the configuration of the normal PRACH (in a licensed band). FIG. 16 is an explanatory diagram illustrating a configuration of the normal PRACH (in a licensed band). In this way, the normal PRACH is transmitted in a continuous frequency range in a portion of the uplink carrier. However, with this configuration, the demand on the power spectral density (PSD) in unlicensed bands is not satisfied.

Figure 17:
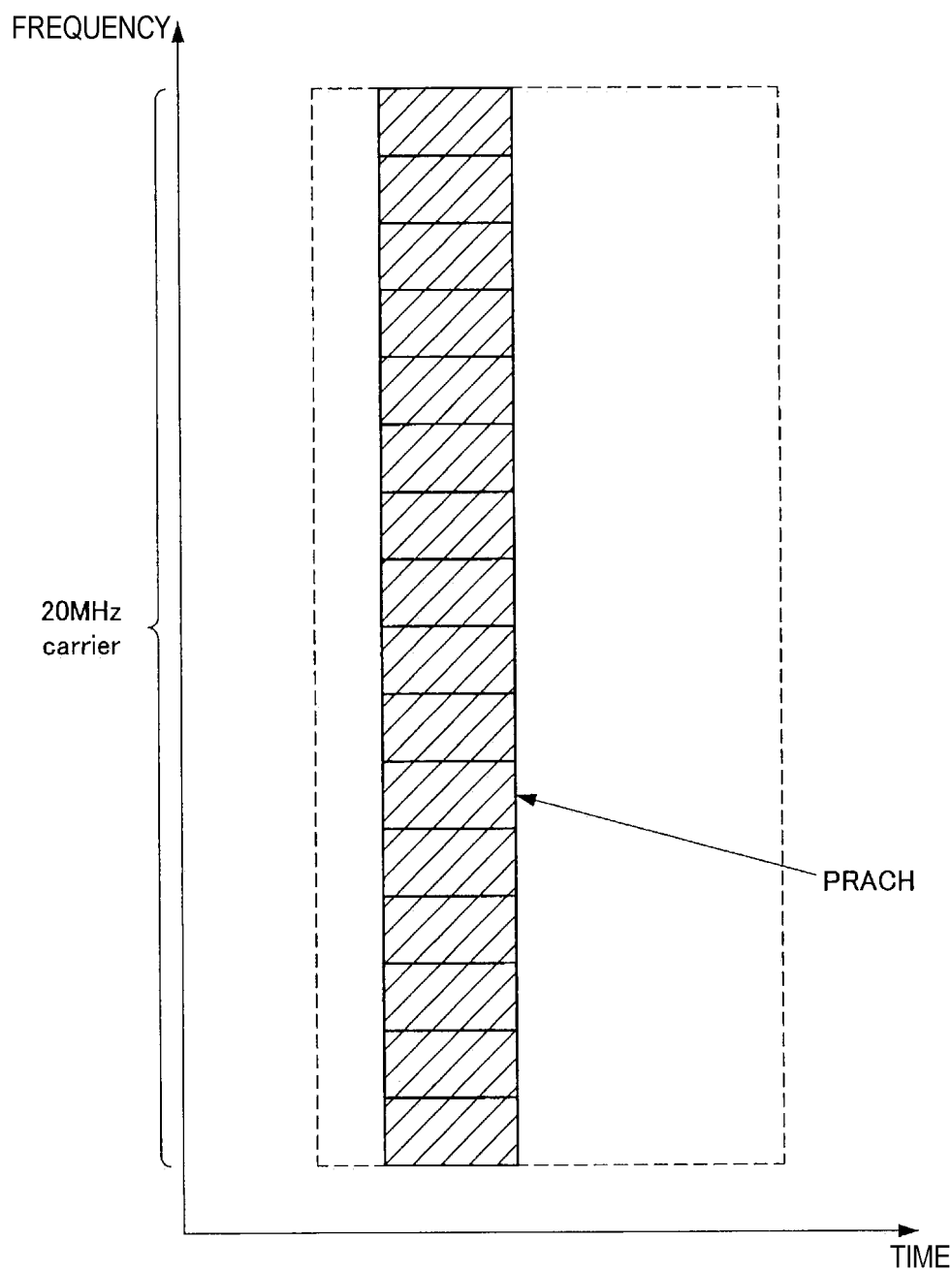
FIG. 17 is an explanatory diagram illustrating a configuration of the PRACH in an NR unlicensed band.

The PRACH in an NR unlicensed band may also be spread over the entire frequency range. FIG. 17 is an explanatory diagram illustrating a configuration of the PRACH in an NR unlicensed band. In this way, the PRACH in an NR unlicensed band may also be spread over the entire frequency range of the carrier. In this case, the PRACH signal sequence may be repeated over the frequency, or the subcarrier spacing of the PRACH may be widened.

Figure 18:
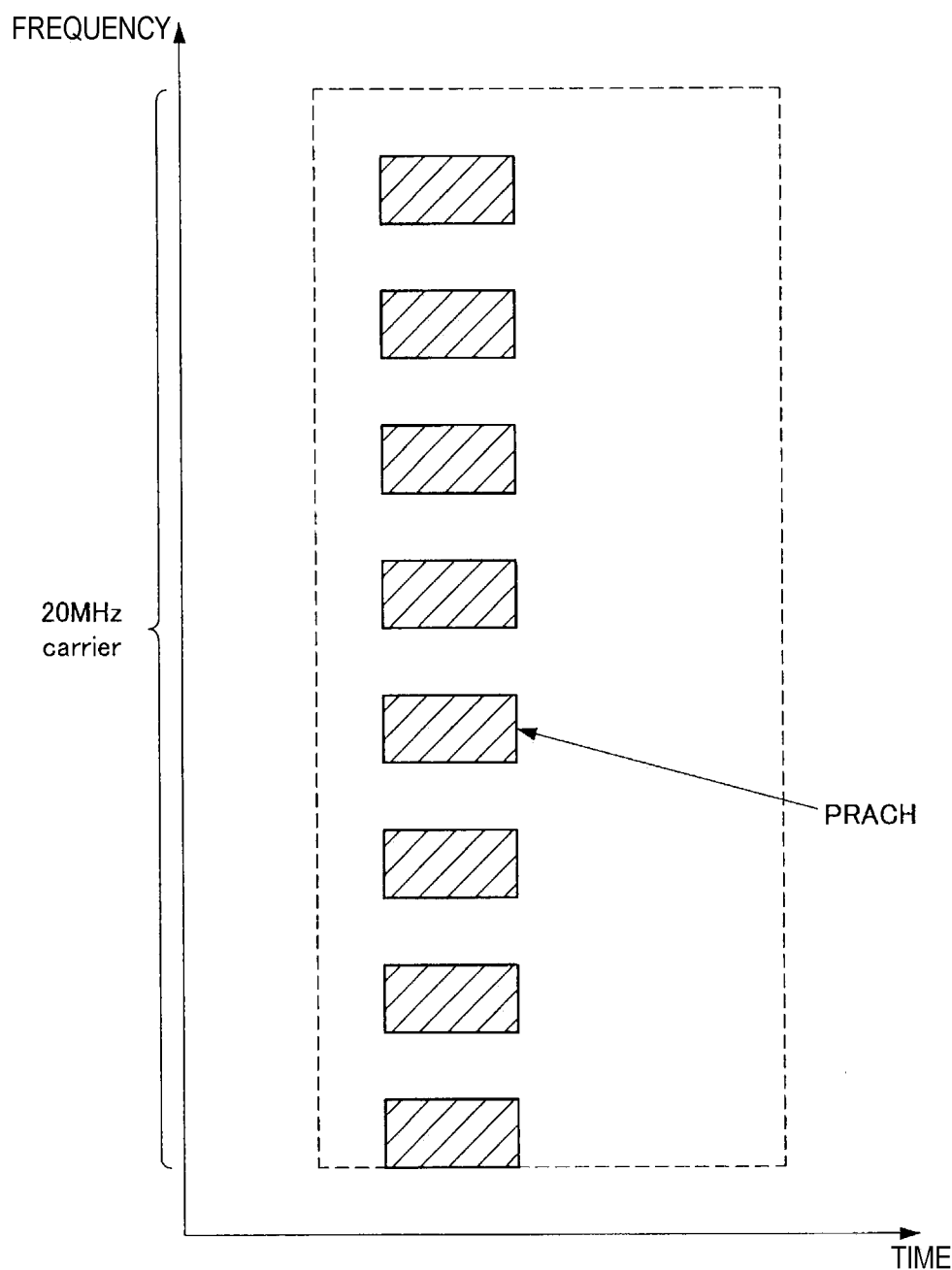
FIG. 18 is an explanatory diagram illustrating a configuration of the PRACH in an NR unlicensed band.

The PRACH in an NR unlicensed band may also be assigned to interlaced resources. FIG. 18 is an explanatory diagram illustrating a configuration of the PRACH in an NR unlicensed band. In the case of assigning the PRACH to interlaced resources, the resources may be interlaced in units of tones (symbols). By interlacing in units of tones (symbols), the PRACH can be spread over the entire band with few resources. By interlacing in units of tones (symbols), it is easy to maintain the orthogonality of the ZC sequence. Also, in the case of assigning the PRACH to interlaced resources, the resources may be interlaced in units of resource blocks. By interlacing in units of resource blocks, it is easy to attain FDM with another uplink channel or signal.

Next, the signal design of Message 1 in the two-step RACH procedure in an NR unlicensed band will be described. Message 1 of the two-step RACH procedure in an NR unlicensed band may be the PRACH only, the PUSCH only, or a combination of the PRACH and the PUSCH.

Figure 19:
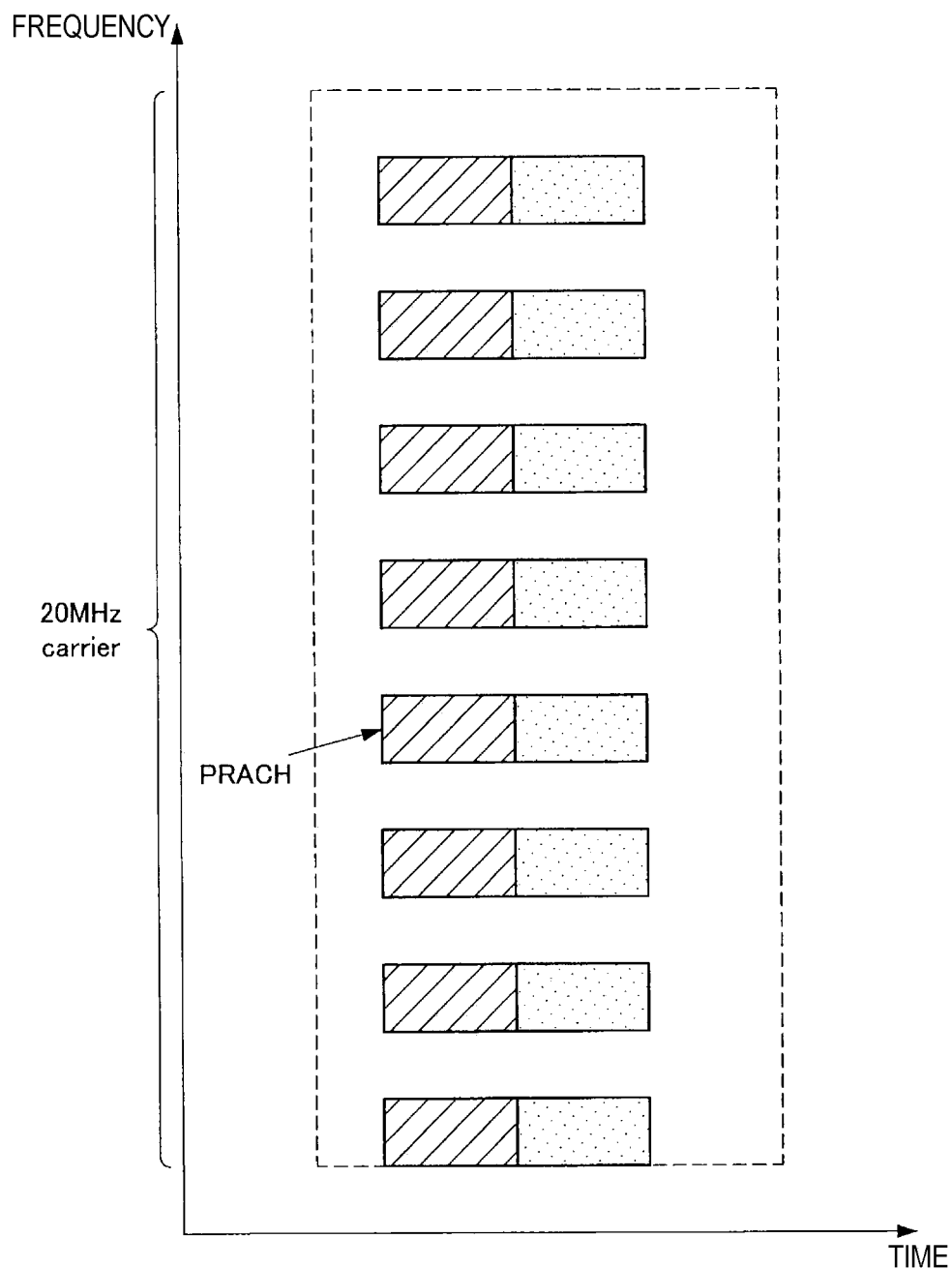
FIG. 19 is an explanatory diagram illustrating an example of a situation in which the PRACH and the PUSCH are TDM and are also transmitted continuously in the same PRACH occasion.

In the case of a combination of the PRACH and the PUSCH, the PRACH and the PUSCH may be combined by time-division multiplexing (TDM), and furthermore may be transmitted continuously in the same PRACH occasion. FIG. 19 is an explanatory diagram illustrating an example of a situation in which the PRACH and the PUSCH are TDM and are also transmitted continuously in the same PRACH occasion.

Figure 20:
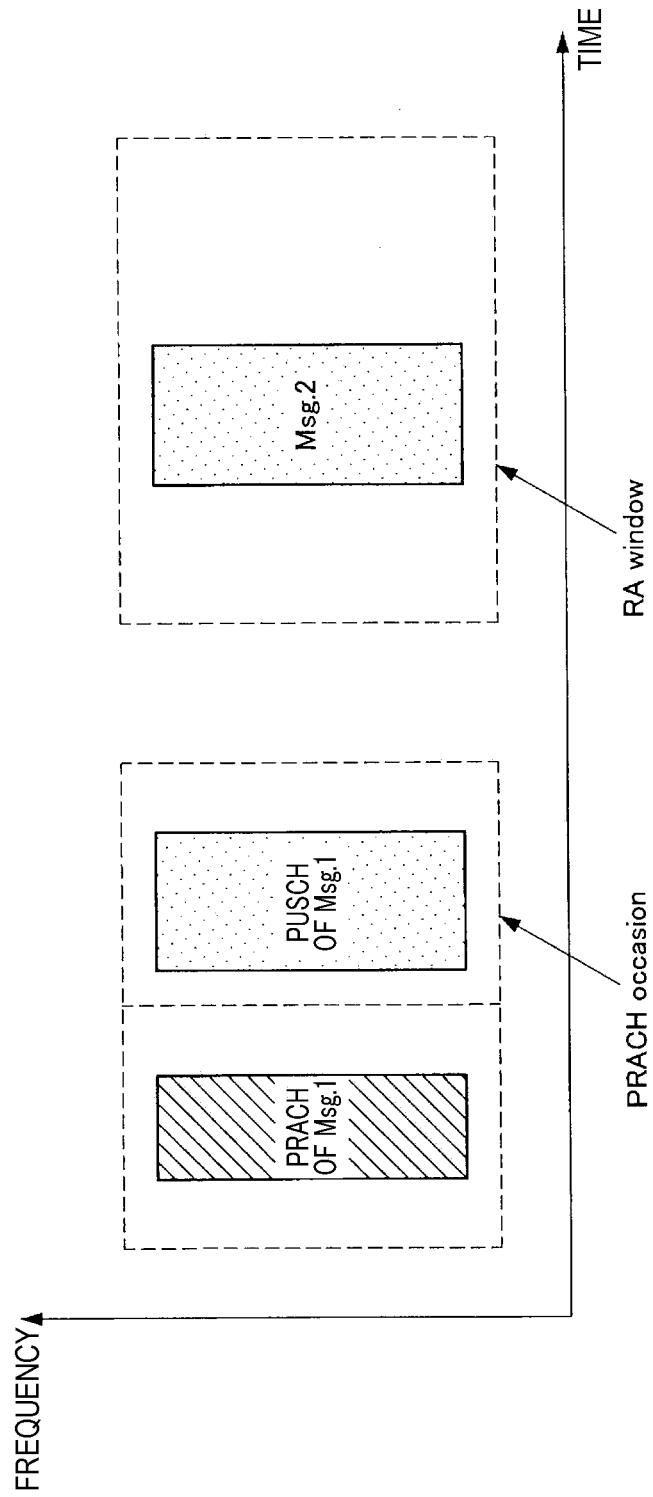
FIG. 20 is an explanatory diagram illustrating an example of a situation in which the PRACH and the PUSCH are TDM, and are transmitted in respectively different PRACH occasions.

Also, in the case of a combination of the PRACH and the PUSCH, the PRACH and the PUSCH may be TDM, and furthermore, the PRACH and the PUSCH may be transmitted respectively in different PRACH occasions. FIG. 20 is an explanatory diagram illustrating an example of a situation in which the PRACH and the PUSCH are TDM, and are also transmitted respectively in different PRACH occasions. The PUSCH is sent before the random access response (RAR) window. On the other hand, if transmission before the random access response (RAR) window is unavailable due to LBT failure or the like, the RACH procedure falls back to the four-step RACH procedure.

Figure 21:
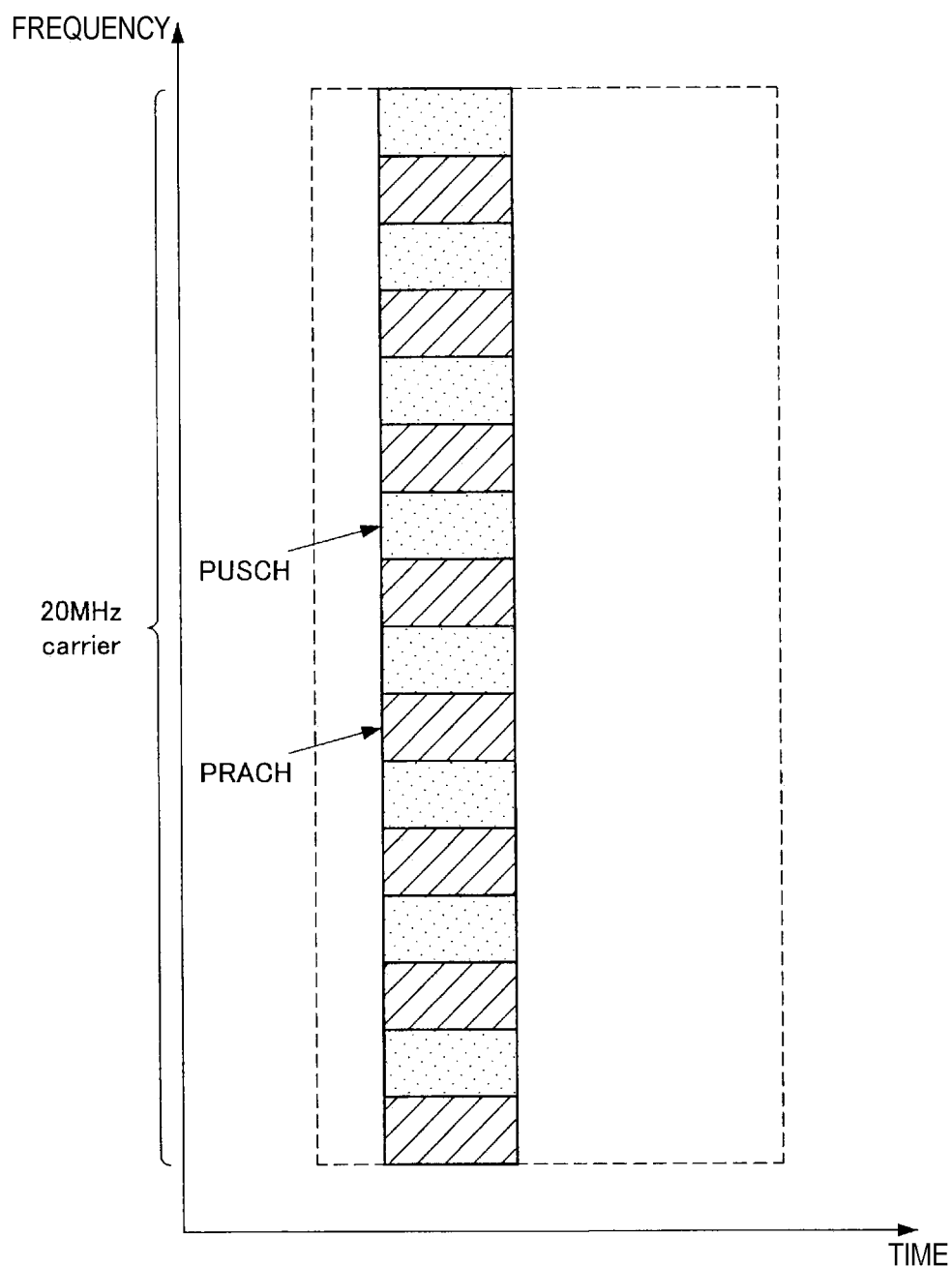
FIG. 21 is an explanatory diagram illustrating an example of a situation in which the PRACH and the PUSCH are FDM.

Also, in the case of a combination of the PRACH and the PUSCH, the PRACH and the PUSCH may also be combined by FDM. FIG. 21 is an explanatory diagram illustrating an example of a situation in which the PRACH and the PUSCH are FDM.

By executing such operations, the base station device 100 and the terminal device 200 are capable of using resources efficiently in an NR-U. Among the configuration of the base station device 100 illustrated in FIG. 12, the setting unit 151 sets the various settings described above for using resources efficiently in an NR-U. Additionally, the communication processing unit 153 executes a process of notifying the terminal device 200 of the content set by the setting unit 151. Additionally, among the configuration of the terminal device 200 illustrated in FIG. 13, the information acquisition unit 241 acquires various settings transmitted from the base station device 100. The communication processing unit 243 executes a process of communicating wirelessly with the base station device 100 in an NR-U on the basis of the various settings acquired by the information acquisition unit 241. Also, the communication processing unit 243 executes LBT and selects a resource for transmitting an uplink signal on the basis of the result of LBT.

2. APPLICATION EXAMPLES

The technology according to the present disclosure can be applied to various products. For example, the base station device 100 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station device 100 may be realized as another type of base station such as a NodeB or a base transceiver station (BTS). The base station device 100 may include a main entity (also referred to as a base station device) that controls wireless communication and one or more remote radio heads (RRHs) disposed at different locations from the main entity. Further, various types of terminals to be described later may operate as the base station device 100 by performing a base station function temporarily or semi-permanently.

Further, for example, the terminal device 200 may be realized as a mobile terminal such as a smartphone, a tablet personal computer (PC), a notebook PC, a portable game terminal, a portable/dongle mobile router or a digital camera, or an in-vehicle terminal such as a car navigation device. Further, the terminal device 200 may be realized as a terminal that performs machine to machine (M2M) communication (also referred to as a machine type communication (MTC) terminal). Moreover, the terminal device 200 may be a wireless communication module mounted on the terminal (for example, an integrated circuit module configured on one die).

2.1. Application Examples for Base Station Device

First Application Example

Figure 22:
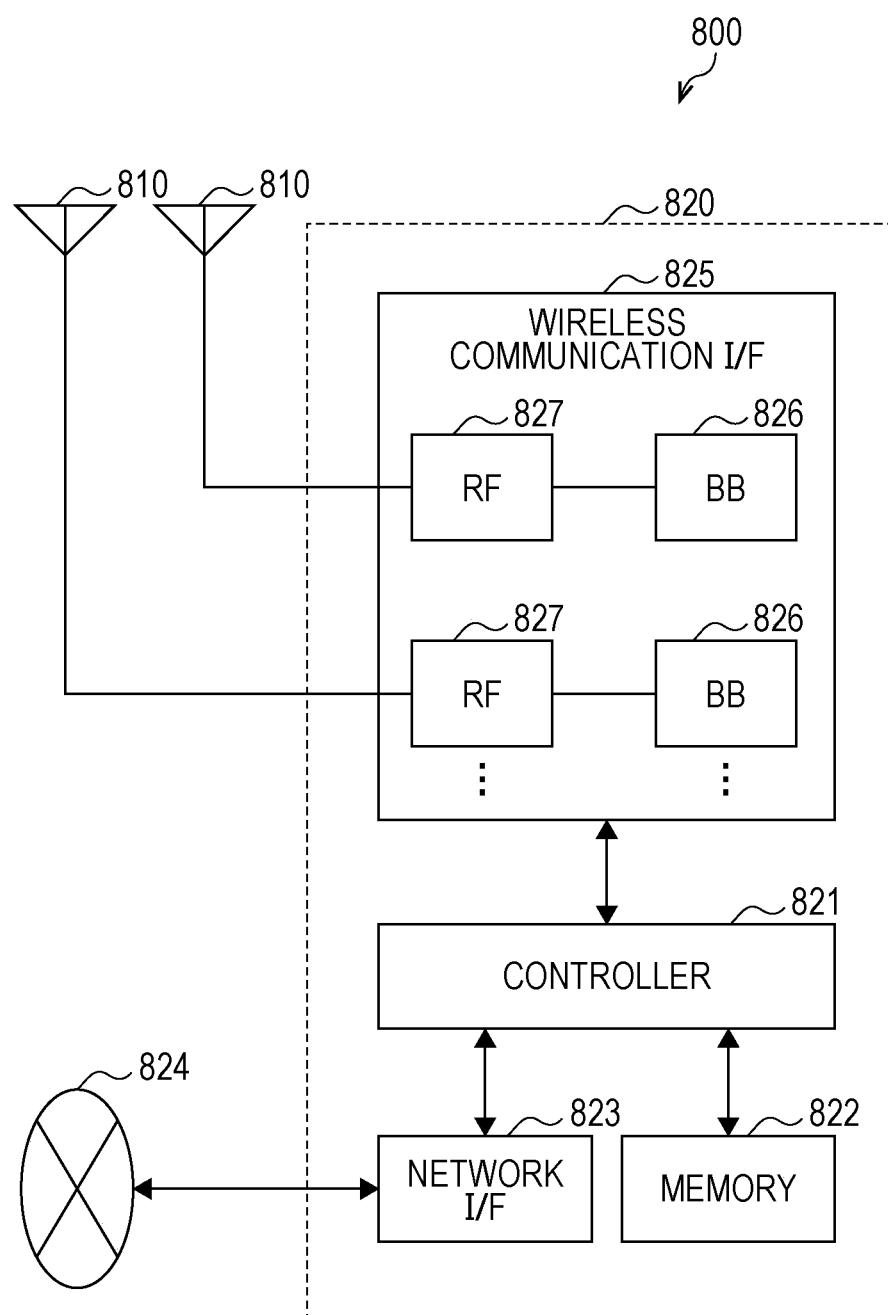
FIG. 22 is a block diagram illustrating a first example of a schematic configuration of an eNB to which the technology according to the present disclosure is applied.

FIG. 22 is a block diagram illustrating a first example of a schematic configuration of an eNB to which the technology according to the present disclosure may be applied. An eNB 800 includes one or more antennas 810 and a base station device 820. Each antenna 810 and the base station device 820 may be connected to each other via an RF cable.

Each of the antennas 810 includes a single or a plurality of antenna elements (e.g., a plurality of antenna elements constituting a MIMO antenna) and is used for the base station device 820 to transmit and receive a wireless signal. The eNB 800 may include the plurality of the antennas 810 as illustrated in FIG. 22, and the plurality of antennas 810 may, for example, correspond to a plurality of frequency bands used by the eNB 800. It should be noted that while FIG. 22 illustrates an example in which the eNB 800 includes the plurality of antennas 810, the eNB 800 may include the single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station device 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station device 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 22, and the plurality of BB processors 826 may, for example, correspond to a plurality of frequency bands used by the eNB 800. Further, the wireless communication interface 825 may also include a plurality of the RF circuits 827, as illustrated in FIG. 22, and the plurality of RF circuits 827 may, for example, correspond to a plurality of antenna elements. Note that FIG. 22 illustrates an example in which the wireless communication interface 825 includes the plurality of BB processors 826 and the plurality of RF circuits 827, but the wireless communication interface 825 may include the single BB processor 826 or the single RF circuit 827.

One or more constituent elements (the setting unit 151 and/or the communication processing unit 153) included in the control unit 150 described with reference to FIG. 12 may be implemented in the wireless communication interface 825 in the eNB 800 shown in FIG. 22. Alternatively, at least some of these constituent elements may be implemented in the controller 821. As an example, the eNB 800 may be equipped with a module including a part (for example, the BB processor 826) or all of the wireless communication interface 825 and/or the controller 821, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the eNB 800 and executed by the wireless communication interface 825 (for example, the BB processor 826) and/or the controller 821. As described above, the eNB 800, the base station device 820, or the above-described module may be provided as an apparatus including the one or more constituent elements. Alternatively, a program for causing a processor to function as the one or more constituent elements may be provided. Moreover, a readable recording medium on which the above-described program has been recorded may be provided.

Furthermore, the wireless communication unit 120 described with reference to FIG. 12 may be implemented in the wireless communication interface 825 (for example, the RF circuit 827) in the eNB 800 shown in FIG. 22. In addition, the antenna unit 110 may be implemented on the antenna 810. Moreover, the network communication unit 130 may be implemented in the controller 821 and/or the network interface 823. Furthermore, the storage unit 140 may be implemented in the memory 822.

Second Application Example

Figure 23:
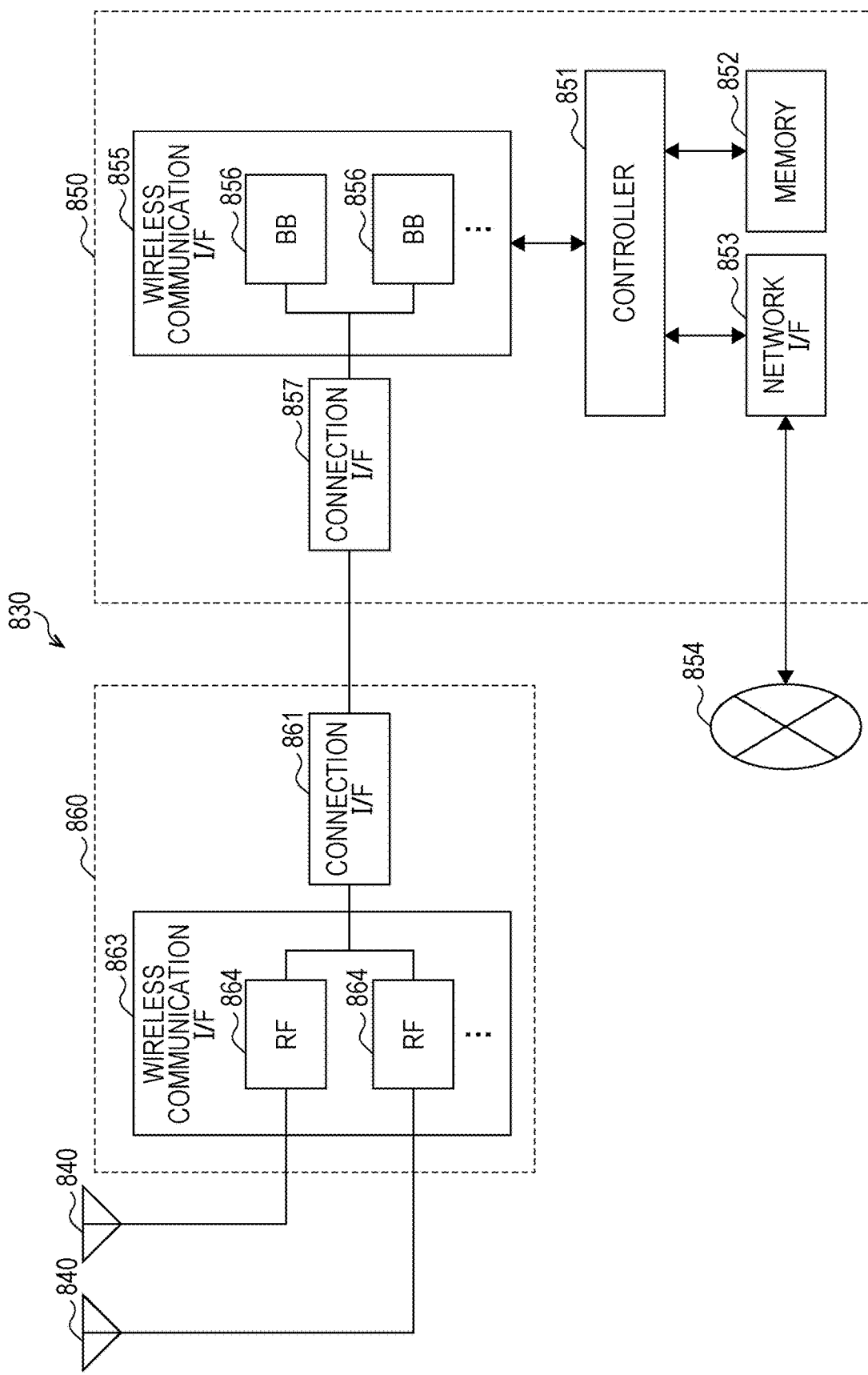
FIG. 23 is a block diagram illustrating a second example of a schematic configuration of an eNB to which the technology according to the present disclosure is applied.

FIG. 23 is a block diagram showing a second example of the schematic configuration of the eNB to which the technology according to the present disclosure can be applied. An eNB 830 includes one or more antennas 840, a base station device 850, and an RRH 860. Each antenna 840 and the RRH 860 can be connected to each other via an RF cable. Furthermore, the base station device 850 and the RRH 860 can be connected to each other via a high-speed line such as an optical fiber cable.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 23, and the plurality of antennas 840 may, for example, correspond to a plurality of frequency bands used by the eNB 830. Note that FIG. 23 illustrates an example in which the eNB 830 includes the plurality of antennas 840, but the eNB 830 may include the single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 22.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 22 except that the BB processor 856 is connected to an RF circuit 864 of the RRH 860 via the connection interface 857. The wireless communication interface 855 may include a plurality of the BB processors 856, as illustrated in FIG. 23, and the plurality of BB processors 856 may, for example, correspond to a plurality of frequency bands used by the eNB 830. Note that FIG. 23 illustrates an example in which the wireless communication interface 855 includes the plurality of BB processors 856, but the wireless communication interface 855 may include the single BB processor 856.

The connection interface 857 is an interface for connecting the base station device 850 (wireless communication interface 855) to the RRH 860. The connection interface 857 may be a communication module for communication on the high speed line which connects the base station device 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 23, and the plurality of RF circuits 864 may, for example, correspond to a plurality of antenna elements. Note that FIG. 23 illustrates an example in which the wireless communication interface 863 includes the plurality of RF circuits 864, but the wireless communication interface 863 may include the single RF circuit 864.

One or more constituent elements (the setting unit 151 and/or the communication processing unit 153) included in the control unit 150 described with reference to FIG. 12 may be implemented in the wireless communication interface 855 and/or the wireless communication interface 863 in the eNB 830 shown in FIG. 23. Alternatively, at least some of these constituent elements may be implemented in the controller 851. As an example, the eNB 830 may be equipped with a module including a part (for example, the BB processor 856) or all of the wireless communication interface 855 and/or the controller 851, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the eNB 830 and executed by the wireless communication interface 855 (for example, the BB processor 856) and/or the controller 851. As described above, the eNB 830, the base station device 850, or the above-described module may be provided as an apparatus including the one or more constituent elements. Alternatively, a program for causing a processor to function as the one or more constituent elements may be provided. Moreover, a readable recording medium on which the above-described program has been recorded may be provided.

Furthermore, for example, the wireless communication unit 120 described with reference to FIG. 6 may be implemented in the wireless communication interface 863 (for example, the RF circuit 864) in the eNB 830 shown in FIG. 23. In addition, the antenna unit 110 may be implemented on the antenna 840. Moreover, the network communication unit 130 may be implemented in the controller 851 and/or the network interface 853. Furthermore, the storage unit 140 may be implemented in the memory 852.

2.2. Application Examples for Terminal Device

First Application Example

Figure 24:
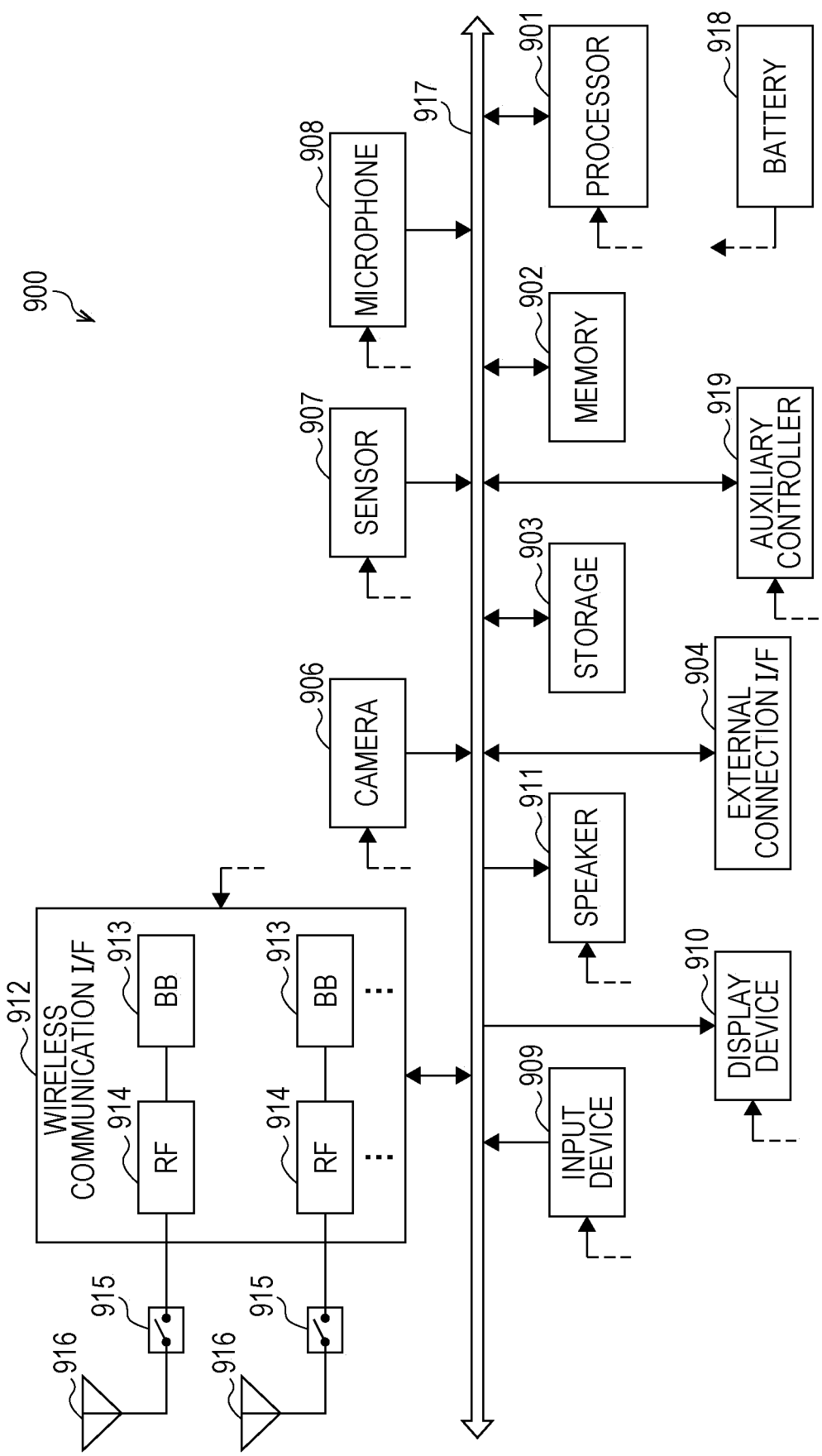
FIG. 24 is a block diagram illustrating an example of a schematic configuration of a smartphone to which the technology according to the present disclosure is applied.

FIG. 24 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 24. Note that FIG. 24 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 24. Note that FIG. 24 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 24 via a feeder line that is partially illustrated in the figure as a dashed line. The auxiliary controller 919, for example, operates a minimally necessary function of the smartphone 900 in a sleep mode.

One or more constituent elements (a measurement report unit 241 and/or the communication processing unit 243) included in the control unit 240 described with reference to FIG. 13 may be implemented in the wireless communication interface 912 in the smartphone 900 shown in FIG. 24. Alternatively, at least some of these constituent elements may be implemented in the processor 901 or the auxiliary controller 919. As an example, the smartphone 900 may be equipped with a module including a part (for example, the BB processor 913) or all of the wireless communication interface 912, the processor 901, and/or the auxiliary controller 919, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the smartphone 900 and executed by the wireless communication interface 912 (for example, the BB processor 913), the processor 901, and/or the auxiliary controller 919. As described above, the smartphone 900 or the above-described module may be provided as an apparatus including the one or more constituent elements. Alternatively, a program for causing a processor to function as the one or more constituent elements may be provided. Moreover, a readable recording medium on which the above-described program has been recorded may be provided.

Furthermore, for example, the wireless communication unit 220 described with reference to FIG. 13 may be implemented in the wireless communication interface 912 (for example, the RF circuit 914) in the smartphone 900 shown in FIG. 24. In addition, the antenna unit 210 may be implemented on the antenna 916. Furthermore, the storage unit 230 may be implemented in the memory 902.

Second Application Example

Figure 25:
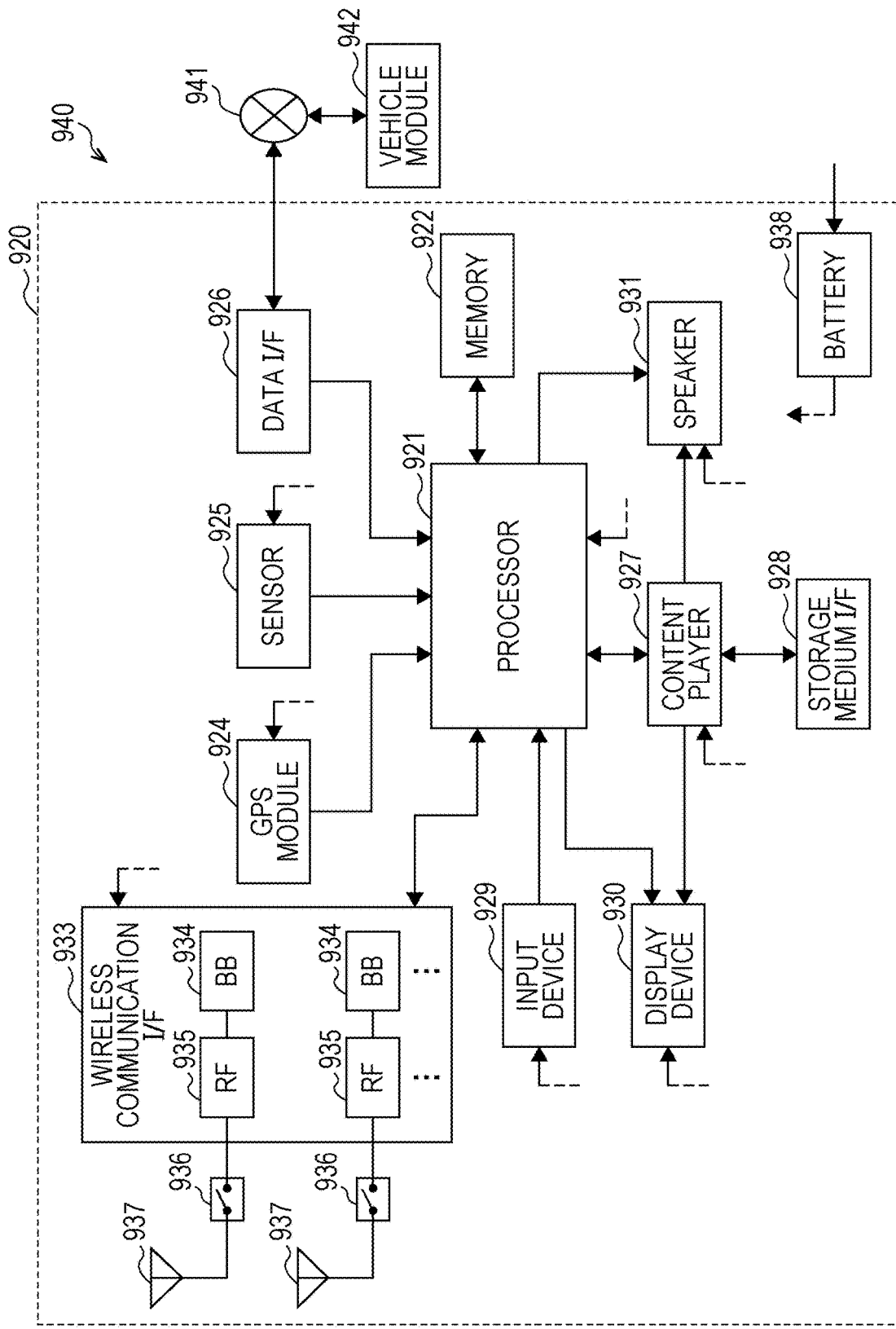
FIG. 25 is a block diagram illustrating an example of a schematic configuration of a car navigation device to which the technology according to the present disclosure is applied.

FIG. 25 is a block diagram illustrating an example of a schematic configuration of a car navigation device 920 to which the technology according to the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation device 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation device 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 25. Note that FIG. 25 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation device 920 may include a plurality of antennas 937 as illustrated in FIG. 25. Note that FIG. 25 illustrates an example in which the car navigation device 920 includes a plurality of antennas 937, but the car navigation device 920 may include a single antenna 937.

Further, the car navigation device 920 may include the antenna 937 for each wireless communication system. In this case, the antenna switch 936 may be omitted from a configuration of the car navigation device 920.

The battery 938 supplies electric power to each block of the car navigation device 920 illustrated in FIG. 25 via a feeder line that is partially illustrated in the figure as a dashed line. Further, the battery 938 accumulates the electric power supplied from the vehicle.

One or more constituent elements (the measurement report unit 241 and/or the communication processing unit 243) included in the control unit 240 described with reference to FIG. 13 may be implemented in the wireless communication interface 933 in the car navigation device 920 shown in FIG. 25. Alternatively, at least some of these constituent elements may be implemented in the processor 921. As an example, the car navigation device 920 may be equipped with a module including a part (for example, the BB processor 934) or all of the wireless communication interface 933 and/or the processor 921, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the car navigation device 920 and executed by the wireless communication interface 933 (for example, the BB processor 934) and/or the processor 921. As described above, the car navigation device 920 or the above-described module may be provided as an apparatus including the one or more constituent elements. Alternatively, a program for causing a processor to function as the one or more constituent elements may be provided. Moreover, a readable recording medium on which the above-described program has been recorded may be provided.

Furthermore, for example, the wireless communication unit 220 described with reference to FIG. 13 may be implemented in the wireless communication interface 933 (for example, the RF circuit 935) in the car navigation device 920 shown in FIG. 25. In addition, the antenna unit 210 may be implemented on the antenna 937. Furthermore, the storage unit 230 may be implemented in the memory 922.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

3. CONCLUSION

According to the embodiment of the present disclosure as described above, it is possible to provide the base station device 100 and the terminal device 200 capable of executing the RACH procedure when LBT failure occurs, and thereby use resources efficiently in an NR-U.

It is possible to create a computer program for causing hardware such as a CPU, ROM, and RAM built into each device to exhibit functions that are substantially the same as the configuration of each device described above. Further, it is also possible to provide a storage medium having the computer program stored therein. Additionally, by configuring each of the function blocks illustrated in the function block diagrams as hardware, the series of processes may also be achieved by hardware.

The preferred embodiment(s) of the present disclosure has/have been described above with reference to the accompanying drawings, whilst the present disclosure is not limited to the above examples. A person skilled in the art may find various alterations and modifications within the scope of the technical idea described in the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present disclosure may also be configured as below.

(1)
A wireless communication device including:
a determination unit configured to determine whether a channel is clear or busy;
a communication unit configured to transmit an uplink signal of a RACH procedure; and
a setting unit configured to set at least a first resource and a second resource to transmit the uplink signal, in which
the first resource is selected from a set of resources set by information in an RRC layer, and
the second resource is designated by downlink information in a physical layer.

(2)
The wireless communication device according to (1), in which the first resource and the second resource are resources that differ in time.

(3)
The wireless communication device according to (2), in which the first resource and the second resource are resources that differ in frequency.

(4)
The wireless communication device according to any one of (1) to (3), in which the RACH procedure is a four-step RACH procedure.

(5)
The wireless communication device according to (4), in which a carrier of Message 1 and a carrier of Message 3 in the four-step RACH procedure are different.

(6)
The wireless communication device according to (5), in which the carrier of Message 3 in the four-step RACH procedure is designated in Message 2.

(7)
The wireless communication device according to (5), in which the setting unit selects the carrier of Message 3 in the four-step RACH procedure from among a plurality of candidates.

(8)
The wireless communication device according to (4), in which the setting unit sets a plurality of resources for Message 3 in the four-step RACH procedure.

(9)
The wireless communication device according to any one of (1) to (3), in which the RACH procedure is a two-step RACH procedure.

(10)
The wireless communication device according to (1), in which the determination unit is further configured to determine, from a content of Message 2, whether the RACH procedure is a two-step RACH procedure or a four-step RACH procedure.

(11)
The wireless communication device according to any one of (1) to (10), in which resources for a PRACH transmitted in the RACH procedure are spread out over an entire frequency range of a carrier.

(12)
The wireless communication device according to any one of (1) to (10), in which resources for a PRACH transmitted in the RACH procedure are interlaced in a frequency range of a carrier.

(13)
The wireless communication device according to any one of (1) to (10), in which a PRACH and a PUSCH transmitted in the RACH procedure are time-division multiplexed, and are also transmitted continuously in a same PRACH occasion.

(14)
The wireless communication device according to any one of (1) to (10), in which a PRACH and a PUSCH transmitted in the RACH procedure are time-division multiplexed, and are also transmitted respectively in different PRACH occasions.

(15)
The wireless communication device according to any one of (1) to (10), in which a PRACH and a PUSCH transmitted in the RACH procedure are frequency-division multiplexed.

(16)
A wireless communication device including:
a determination unit configured to determine whether a channel is clear or busy;
a communication unit configured to receive an uplink signal of a RACH procedure; and
a setting unit configured to set at least a first resource and a second resource for transmitting the uplink signal, in which
the first resource is selected from a set of resources set by information in an RRC layer, and
the communication unit designates the second resource by downlink information in a physical layer.

(17)
The wireless communication device according to (16), in which the first resource and the second resource are resources that differ in time.

(18)
The wireless communication device according to (17), in which the first resource and the second resource are resources that differ in frequency.

(19)
The wireless communication device according to any one of (16) to (18), in which the RACH procedure is a four-step RACH procedure.

(20)
The wireless communication device according to any one of (16) to (18), in which the RACH procedure is a two-step RACH procedure.

(21)
A wireless communication method including:
determining whether a channel is clear or busy;
transmitting an uplink signal of a RACH procedure; and
setting at least a first resource and a second resource to transmit the uplink signal, in which
the first resource is selected from a set of resources set by information in an RRC layer, and
the second resource is designated by downlink information in a physical layer.

(22)
A wireless communication method including:
determining whether a channel is clear or busy;
receiving an uplink signal of a RACH procedure; and
setting at least a first resource and a second resource for transmitting the uplink signal, in which
the first resource is selected from a set of resources set by information in an RRC layer, and
the communication unit designates the second resource by downlink information in a physical layer.

(23)
A computer program causing a computer to execute a process including:
determining whether a channel is clear or busy;
transmitting an uplink signal of a RACH procedure; and
setting at least a first resource and a second resource to transmit the uplink signal, in which
the first resource is selected from a set of resources set by information in an RRC layer, and
the second resource is designated by downlink information in a physical layer.

(24)
A computer program causing a computer to execute a process including:
determining whether a channel is clear or busy;
receiving an uplink signal of a RACH procedure; and
setting at least a first resource and a second resource for transmitting the uplink signal, in which
the first resource is selected from a set of resources set by information in an RRC layer, and
the communication unit designates the second resource by downlink information in a physical layer.

REFERENCE SIGNS LIST

100 Base station device
200 Terminal device

The invention claimed is:

1. A wireless communication device configured as a user equipment (UE) and comprising:
a transceiver; and
circuitry configured to:
set a first resource and at least one second resource to transmit an uplink signal of a RACH procedure to a base station (BS), wherein
the first resource is selected from a set of resources set by information in an RRC layer,
the at least one second resource is designated by the BS for use by the wireless communication device in a case when the wireless communication device determines that the first resource is not available, the at least one second resource being designated by downlink information in a physical layer,
the downlink information in the physical layer being one of:
a notice of the one or more second resources in a channel occupancy time (COT), the notice being included in downlink control information (DCI), or
a slot format indicator (SFI) included in the DCI that identifies the one or more second resources, and
the first resource occurs before the at least one second resource;
determine whether the first resource is clear or busy:
upon determining that the first resource is busy, determine that the at least one second resource is clear; and
transmit the uplink signal of the RACH procedure to the BS via the at least one second resource.

2. The wireless communication device according to claim 1, wherein the first resource and the second resource are resources that differ in frequency.

3. The wireless communication device according to claim 1, wherein the RACH procedure is a four-step RACH procedure.

4. The wireless communication device according to claim 3, wherein a carrier of Message 1 and a carrier of Message 3 in the four-step RACH procedure are different.

5. The wireless communication device according to claim 4, wherein the carrier of Message 3 in the four-step RACH procedure is designated in Message 2.

6. The wireless communication device according to claim 4, wherein the circuitry selects the carrier of Message 3 in the four-step RACH procedure from among a plurality of candidates.

7. The wireless communication device according to claim 3, wherein the circuitry sets a plurality of resources for Message 3 in the four-step RACH procedure.

8. The wireless communication device according to claim 1, wherein the RACH procedure is a two-step RACH procedure.

9. The wireless communication device according to claim 1, wherein the circuitry is further configured to determine, from a content of Message 2, whether the RACH procedure is a two-step RACH procedure or a four-step RACH procedure.

10. The wireless communication device according to claim 1, wherein resources for a PRACH transmitted in the RACH procedure are spread out over an entire frequency range of a carrier.

11. The wireless communication device according to claim 1, wherein resources for a PRACH transmitted in the RACH procedure are interlaced in a frequency range of a carrier.

12. The wireless communication device according to claim 1, wherein a PRACH and a PUSCH transmitted in the RACH procedure are time-division multiplexed, and are also transmitted continuously in a same PRACH occasion.

13. The wireless communication device according to claim 1, wherein a PRACH and a PUSCH transmitted in the RACH procedure are time-division multiplexed, and are also transmitted respectively in different PRACH occasions.

14. The wireless communication device according to claim 1, wherein a PRACH and a PUSCH transmitted in the RACH procedure are frequency-division multiplexed.

15. A wireless communication device configured as a base station (BS) and comprising:
a transceiver; and
circuitry configured to:
set a first resource and at least one second resource for use by a user equipment (UE) to transmit an uplink signal of a RACH procedure to the BS, wherein
the first resource is selected from a set of resources set by information in an RRC layer,
the at least one second resource is designated by the BS for use by the wireless communication device in a case when the UE determines that the first resource is not available, the at least one second resource being designated by downlink information in a physical layer,
the downlink information in the physical layer being one of:
a notice of the one or more second resources in a channel occupancy time (COT), the notice being included in downlink control information (DCI), or
a slot format indicator (SFI) included in the DCI that identifies the one or more second resources, and
the first resource occurs before the at least one second resource; and
receive the uplink signal of the RACH procedure from the UE via the at least one second resource upon the UE determining that that the first resource is not available.

16. The wireless communication device according to claim 15, wherein the first resource and the second resource are resources that differ in frequency.

17. The wireless communication device according to claim 15, wherein the RACH procedure is a four-step RACH procedure.

18. The wireless communication device according to claim 15, wherein the RACH procedure is a two-step RACH procedure.

19. A wireless communication method performed by a user equipment (UE), the method comprising:
setting a first resource and at least one second resource to transmit an uplink signal of a RACH procedure to a base station (BS), wherein
the first resource is selected from a set of resources set by information in an RRC layer,
the at least one second resource is designated by the BS for use by the wireless communication device in a case when the wireless communication device determines that the first resource is not available, the at least one second resource being designated by downlink information in a physical layer,
the downlink information in the physical layer being one of:
a notice of the one or more second resources in a channel occupancy time (COT), the notice being included in downlink control information (DCI), or
a slot format indicator (SFI) included in the DCI that identifies the one or more second resources, and
the first resource occurs before the at least one second resource;
determining whether the first resource is clear or busy;
upon determining that the first resource is busy, determining that the at least one second resource is clear; and
transmitting the uplink signal of the RACH procedure to the BS via the at least one second resource.

20. A wireless communication method performed by a base station (BS), the method comprising:
setting a first resource and at least one second resource for use by a user equipment (UE) to transmit an uplink signal of a RACH procedure to the BS, wherein
the first resource is selected from a set of resources set by information in an RRC layer,
the at least one second resource is designated by the BS for use by the wireless communication device in a case when the UE determines that the first resource is not available, the at least one second resource being designated by downlink information in a physical layer,
the downlink information in the physical layer being one of:
a notice of the one or more second resources in a channel occupancy time (COT), the notice being included in downlink control information (DCI), or
a slot format indicator (SFI) included in the DCI that identifies the one or more second resources, and
the first resource occurs before the at least one second resource; and
receiving the uplink signal of the RACH procedure from the UE via the at least one second resource upon the UE determining that that the first resource is not available.

21. A non-transitory computer product containing a computer program causing a computer to operate as a user equipment (UE) and execute a process comprising:
setting a first resource and at least one second resource to transmit an uplink signal of a RACH procedure to a base station (BS), wherein
the first resource is selected from a set of resources set by information in an RRC layer,
the at least one second resource is designated by the BS for use by the wireless communication device in a case when the wireless communication device determines that the first resource is not available, the at least one second resource being designated by downlink information in a physical layer, the downlink information in the physical layer being one of:
  a notice of the one or more second resources in a channel occupancy time (COT), the notice being included in downlink control information (DCI), or
  a slot format indicator (SFI) included in the DCI that identifies the one or more second resources, and
the first resource occurs before the at least one second resource;
determining whether the first resource is clear or busy;
upon determining that the first resource is busy, determining that the at least one second resource is clear; and
transmitting the uplink signal of the RACH procedure to the BS via the at least one second resource.

22. A non-transitory computer product containing a computer program causing a computer to operate as a base station (BS) execute a process comprising:
  setting a first resource and at least one second resource for use by a user equipment (UE) to transmit an uplink signal of a RACH procedure to the BS, wherein the first resource is selected from a set of resources set by information in an RRC layer,
  the at least one second resource is designated by the BS for use by the wireless communication device in a case when the UE determines that the first resource is not available, the at least one second resource being designated by downlink information in a physical layer,
  the downlink information in the physical layer being one of:
    a notice of the one or more second resources in a channel occupancy time (COT), the notice being included in downlink control information (DCI), or
    a slot format indicator (SFI) included in the DCI that identifies the one or more second resources, and
  the first resource occurs before the at least one second resource; and
  receiving the uplink signal of the RACH procedure from the UE via the at least one second resource upon the UE determining that that the first resource is not available.

* * * * *